United States Patent [19]
Endo et al.

[11] Patent Number: 6,055,563
[45] Date of Patent: Apr. 25, 2000

[54] TRANSFER AND DISPLAY OF VIRTUAL-WORLD DATA

[75] Inventors: Kaori Endo; Yasuhiro Kawakatsu, both of Kawasaki, Japan

[73] Assignee: Fujitsu Limited, Kawasaki, Japan

[21] Appl. No.: 08/910,031

[22] Filed: Aug. 12, 1997

[30] Foreign Application Priority Data

Feb. 3, 1997 [JP] Japan .................................. 9-020615

[51] Int. Cl.[7] .................................................. G06F 13/00
[52] U.S. Cl. .......................................................... 709/203
[58] Field of Search .................................... 709/200, 201, 709/203, 205, 206, 217, 218, 219

[56] References Cited

U.S. PATENT DOCUMENTS

| | | | |
|---|---|---|---|
| 5,675,721 | 10/1997 | Freedman et al. ...................... | 345/502 |
| 5,774,878 | 6/1998 | Marshall .................................. | 705/35 |
| 5,802,296 | 9/1998 | Morse et al. ............................. | 709/208 |
| 5,808,614 | 9/1998 | Nagahara et al. ....................... | 345/355 |
| 5,815,156 | 9/1998 | Takeuchi ................................. | 345/419 |
| 5,874,956 | 2/1999 | LaHood ................................... | 345/339 |

FOREIGN PATENT DOCUMENTS 6-327010  11/1994  Japan .

*Primary Examiner*—Moustafa M. Meky
*Attorney, Agent, or Firm*—Staas & Halsey, LLP

[57] ABSTRACT

A method of displaying a virtual world in a client device based on virtual-world-description data received from a server device via a communication line. The method includes the steps of receiving description-data segments one by one into which the virtual-world description data is divided, and displaying a virtual-world segment at every turn when receiving one of the description-data segments, the virtual-world segment being a portion of the virtual world which is described by the one of the description-data segments.

22 Claims, 29 Drawing Sheets

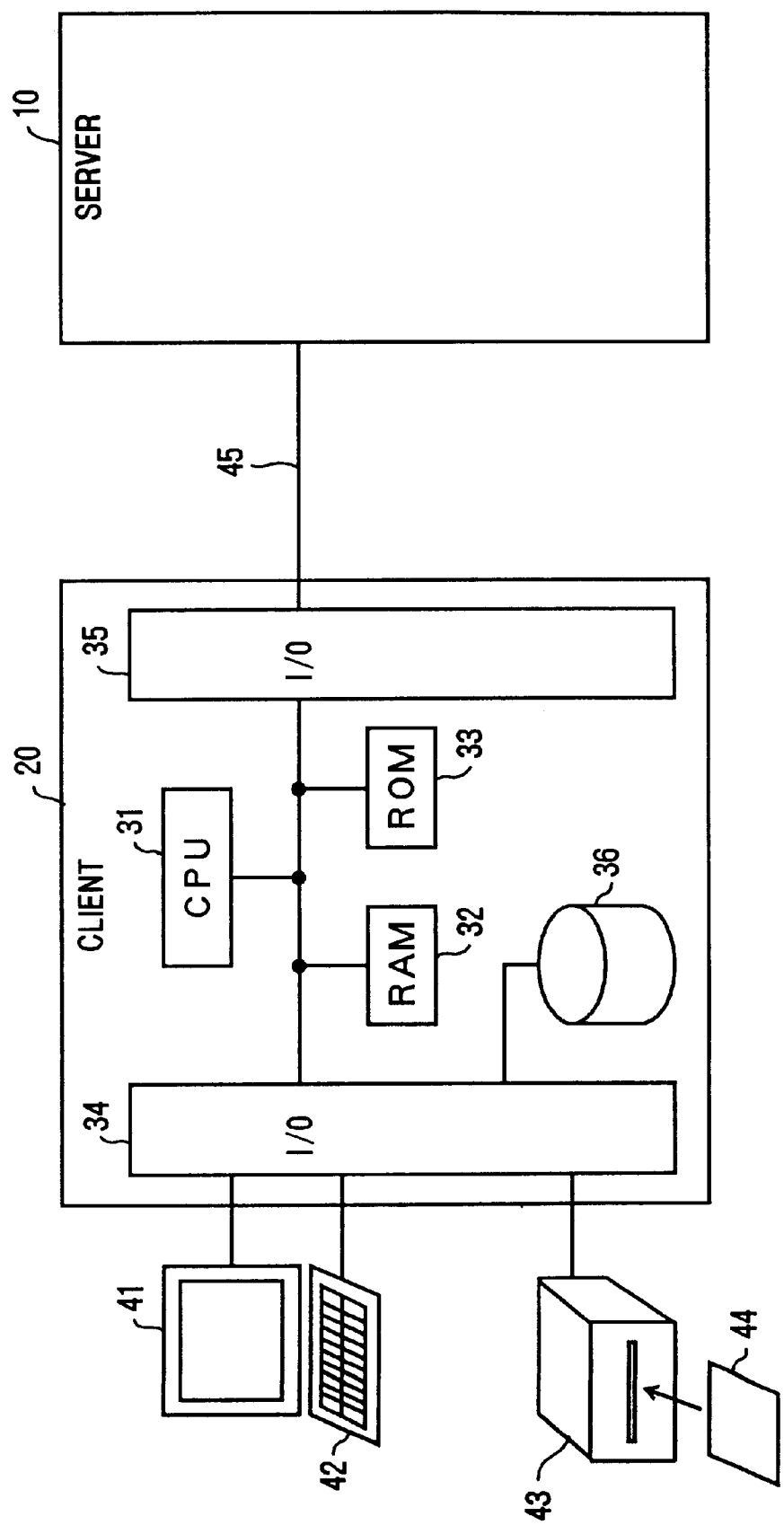

FIG. 7

```
VIEWPOINT INFORMATION
OBJECT DESCRIPTION 1 {
  COORDINATE-TRANSFORMATION INFORMATION
  DESCRIPTION OF ATTRIBUTES
  DESCRIPTION OF SHAPE
      }
  }
OBJECT DESCRIPTION 2 {
  COORDINATE-TRANSFORMATION INFORMATION
  DESCRIPTION OF ATTRIBUTES
  DESCRIPTION OF SHAPE
      }
  }
OBJECT DESCRIPTION 3 {
  COORDINATE-TRANSFORMATION INFORMATION
  DESCRIPTION OF ATTRIBUTES
  DESCRIPTION OF SHAPE
      }
  }
```

FIG. 20

```
VIEWPOINT INFORMATION
OBJECT DESCRIPTION 1 {
    COORDINATE-TRANSFORMATION INFORMATION
    DESCRIPTION OF ATTRIBUTES
    DESCRIPTION OF SHAPE
        }
    }
OBJECT DESCRIPTION 2 {
    COORDINATE-TRANSFORMATION INFORMATION
    DESCRIPTION OF ATTRIBUTES
    DESCRIPTION OF SHAPE
        }
    }
OBJECT DESCRIPTION 3 {
    COORDINATE-TRANSFORMATION INFORMATION
    DESCRIPTION OF ATTRIBUTES
    DESCRIPTION OF SHAPE
        }
    }
OBJECT DESCRIPTION 4 {
    COORDINATE-TRANSFORMATION INFORMATION
    DESCRIPTION OF ATTRIBUTES
    DESCRIPTION OF SHAPE
        }
    }
OBJECT DESCRIPTION 5 {
    COORDINATE-TRANSFORMATION INFORMATION
    DESCRIPTION OF ATTRIBUTES
    DESCRIPTION OF SHAPE
        }
    }
```

90

CHANGED TO 2-DIMENSIONAL DATA

6,055,563

TRANSFER AND DISPLAY OF VIRTUAL-WORLD DATA

BACKGROUND OF THE INVENTION

1. Field of the Invention

The present invention generally relates to methods of displaying a virtual world, and particularly relates to a method of displaying and manipulating a virtual world by transferring data from a remote cite to a local cite via a computer network.

2. Description of the Related Art

Development of 3D-computer-graphics technology along with enhanced processing speed of computers has made it possible to create a virtual world in computers. A world created in computers is displayed on a screen, and user operations are processed with regard to the created and displayed world, thereby establishing an interactive relationship between the users and the created world. This provides a virtual world for the users.

Further, development of computer networks has made it possible for users to enjoy various services by connecting a client device to a server device via a computer network.

An example of services provided by the displaying of a virtual world via a computer network includes a virtual shopping center. Descriptive data of a virtual world with regard to a shopping center is stored in advance in a server device, and is transferred to a client device upon a request from the client. The descriptive data of the virtual world is then displayed on a client screen. Through operations via an interface, the user can walk around in the shopping center, and can shop in virtual stores.

When a virtual world is displayed and operated via a computer network, a large amount of descriptive data of the virtual world needs to be transmitted via the network. The problem is that data transfer from the server to the client needs a lengthy period of time.

Descriptive data of a virtual world represent a shape of each object by a plurality of polygons, and includes coordinates for defining polygon shapes, normal vectors, and attributes such as polygon colors and textures. Upon a request from a user to transfer the descriptive data, a server device transfers the data to the client with respect to a large number of polygons as a single file. The client device displays the descriptive data of the virtual world after the completion of the file transfer. The user has to wait for the display and operation of the virtual world until the file transfer is finished. If descriptive data of a virtual world has a size of 100 Kbytes and is transmitted at a rate of 2400 bps, for example, the user has to wait five to six minutes before starting operation of the virtual world, which is displayed after the completion of the data transfer.

Accordingly, there is a need for a method of displaying a virtual world which can shorten the time length that a user has to wait before the virtual world is displayed in order to accept user operation.

SUMMARY OF THE INVENTION

Accordingly, it is a general object of the present invention to provide a method of displaying a virtual world which can satisfy the need described above.

It is another and more specific object of the present invention to provide a method of displaying a virtual world which can shorten the time length that a user has to wait before the virtual world is displayed in order to accept user operation.

In order to achieve the above objects according to the present invention, a method of displaying a virtual world in a client device based on virtual-world-description data received from a server device via a communication line includes the steps of receiving description-data segments one by one into which the virtual-world description data is divided, and displaying a virtual-world segment at every turn when receiving one of the description-data segments, the virtual-world segment being a portion of the virtual world which is described by the one of the description-data segments.

Further, a method of sending virtual-world description data describing a virtual world from a server device to a client device via a communication line includes the steps of dividing the virtual-world-description data into a plurality of description-data segments, and sending the description-data segments one by one to the client device.

In the methods for the client device and the server device described above, the virtual-world-description data is divided into a plurality of description-data segments, and the description-data segments are transferred and displayed one by one. No matter how large the amount of virtual-world-description data is, displaying of the virtual world is started upon receipt of the first data segment. Because of this configuration, a user does not have to wait until all the virtual-world-description data is transferred before obtaining the displayed virtual world.

According to one aspect of the present invention, the method for the client device further includes a step of responding to and handling user operations made to the virtual world at all times including when the description-data segments are being received and when the virtual-world segment is being displayed.

Accordingly, operations made by a user with regard to the virtual world are accepted and carried out even if the displaying of the description-data segments is currently underway. Further, the user can operate the virtual world from the outset, and does not have to wait until all the virtual world is displayed after all the virtual-world-description data is transferred. Namely, the methods of the present invention can shorten the time length that a user has to wait before the virtual world is displayed and user operations are accepted.

Other objects and further features of the present invention will be apparent from the following detailed description when read in conjunction with the accompanying drawings.

BRIEF DESCRIPTION OF THE DRAWINGS

FIG. 6 is a block diagram of a device which embodies the virtual-world-description-data transfer system according to the principle of the present invention;

FIG. 7 is an illustrative drawing showing an example of virtual-world-description data which is stored in a virtual-world-description-data storage unit;

FIG. 20 is an illustrative drawing showing an example of the virtual-world-description data;

DESCRIPTION OF THE PREFERRED EMBODIMENTS

In the following, a principle and embodiments of the present invention will be described with reference to the accompanying drawings.

Figure 1:
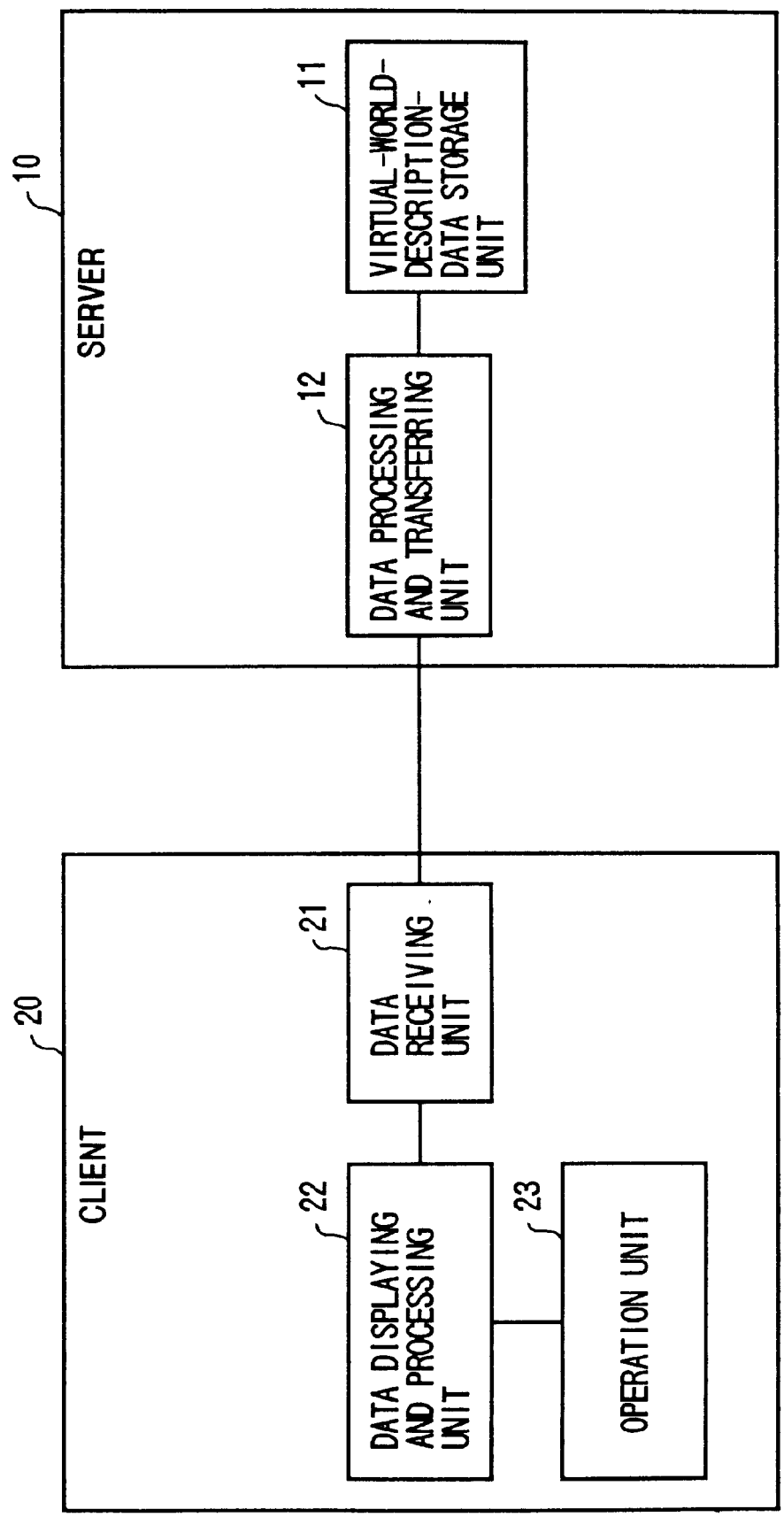
FIG. 1 is a block diagram of a virtual-world-description-data transfer system according to a principle of the present invention.

FIG. 1 is a block diagram of a virtual-world-description-data transfer system according to a principle of the present invention.

The virtual-world-description-data transfer system of FIG. 1 includes a server 10 and a client 20. The server 10 includes a virtual-world-description-data storage unit 11 and a data processing and transferring unit 12. The client 20 includes a data receiving unit 21, a data displaying and processing unit 22, and an operation unit 23.

The virtual-world-description-data storage unit 11 of the server 10 stores virtual-world-description data including coordinates, normal vectors, and attributes such as colors and textures with regard to polygons forming each object in the virtual world. The data processing and transferring unit 12 reads the virtual-world-description data from the virtual-world-description-data storage unit 11, and divides the virtual-world-description data into segments of the virtual-world-description data. Hereinafter, the segments of the virtual-world-description data is referred to as description-data segments, and portions of the virtual world which are described by the respective description-data segments are referred to as virtual-world segments. The data processing and transferring unit 12 transfers the description-data segments one by one as a single file to the client 20.

The data receiving unit 21 of the client 20 receives the description-data segments one after another. The data displaying and processing unit 22 receives the description-data segment one by one from the data receiving unit 21, and displays virtual-world segments one after another. The virtual-world segments are segments of the virtual world which are represented by the description-data segments. The operation unit 23 receives user input with regard to user operation, and supply operation information to the data displaying and processing unit 22. The data displaying and processing unit 22 receives the operation information, and carries out relevant processing even if the displaying of the virtual-world segment is currently underway. The operation information received by the operation unit 23 specifies operations regarding the virtual world, including operations by which a viewpoint or a view direction is changed through a positional shift or a face turn within the virtual world. Also, operations concerning manipulation of objects such as opening a door are also included.

The data processing and transferring unit 12 of the server 10 may prioritize the description-data segments when dividing the virtual-world-description data and sending the description-data segments. The virtual-world-description data is usually divided into objects or sets of objects, and priority may be decided based on a distance between the viewpoint and an object, a size of an object, the number of references indicating how many times the user selected the object, etc. Detailed description as to how the priority is given will be provided later. The data processing and transferring unit 12 may send the description-data segments in an order of priority. In this configuration, the data displaying and processing unit 22 of the client 20 can display the description-data segment in an order of priority.

As described above, according to the principle of the present invention, the virtual-world-description data is divided into a plurality of description-data segments, which are transferred and, displayed one by one. Operation to the virtual world by a user is accepted and carried out even if the displaying of the description-data segments is currently underway. No matter how large the amount of virtual-world-description data is, displaying of the virtual world is started upon receipt of the first data segment. Further, the user can operate the virtual world from the outset, and does not have to wait until all the virtual world is displayed after all the virtual-world-description data is transferred.

Figure 2:
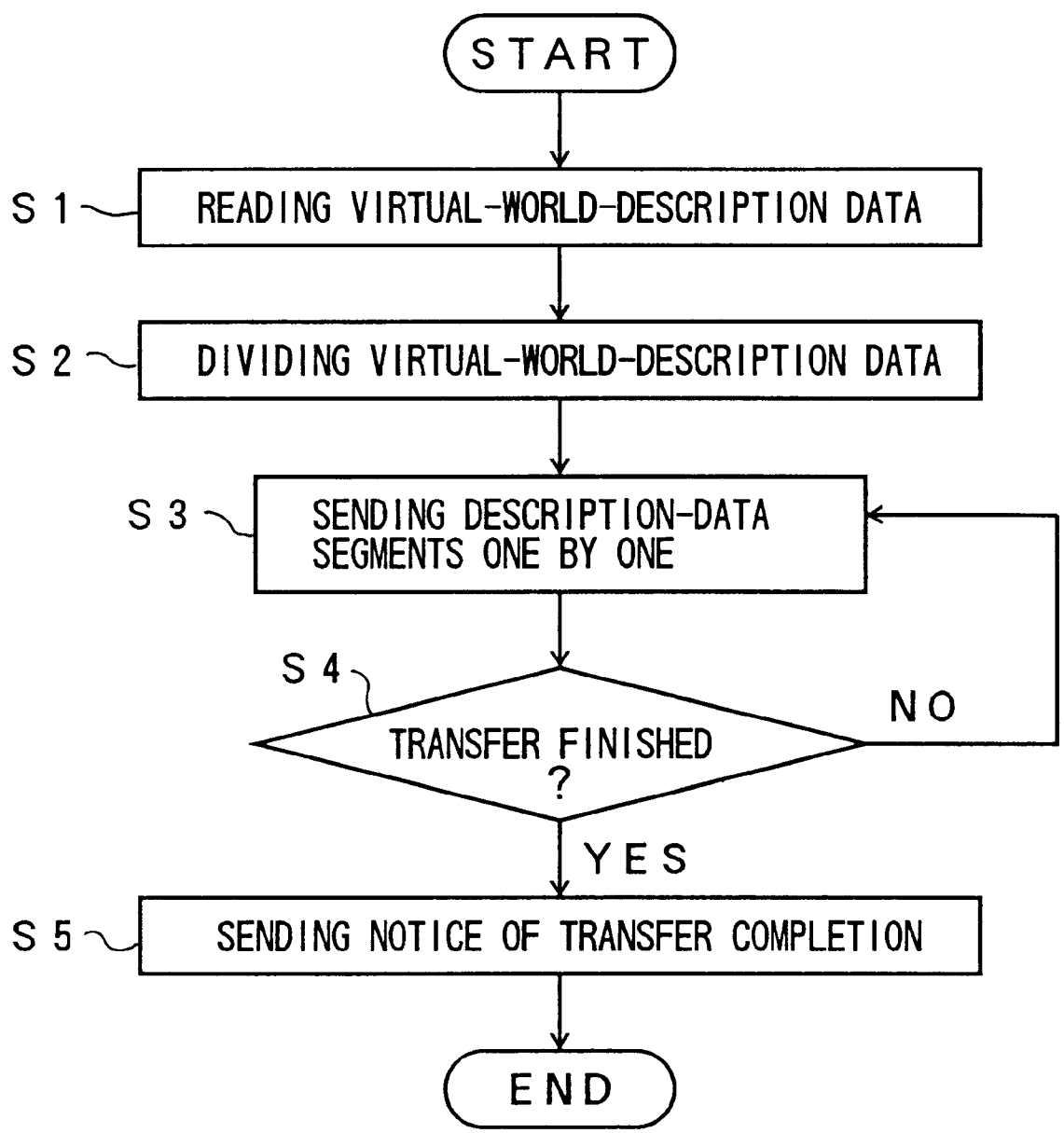
FIGS. 2 through 4 are flowcharts of a virtual-world displaying process according to the principle of the present invention.
Figure 3:
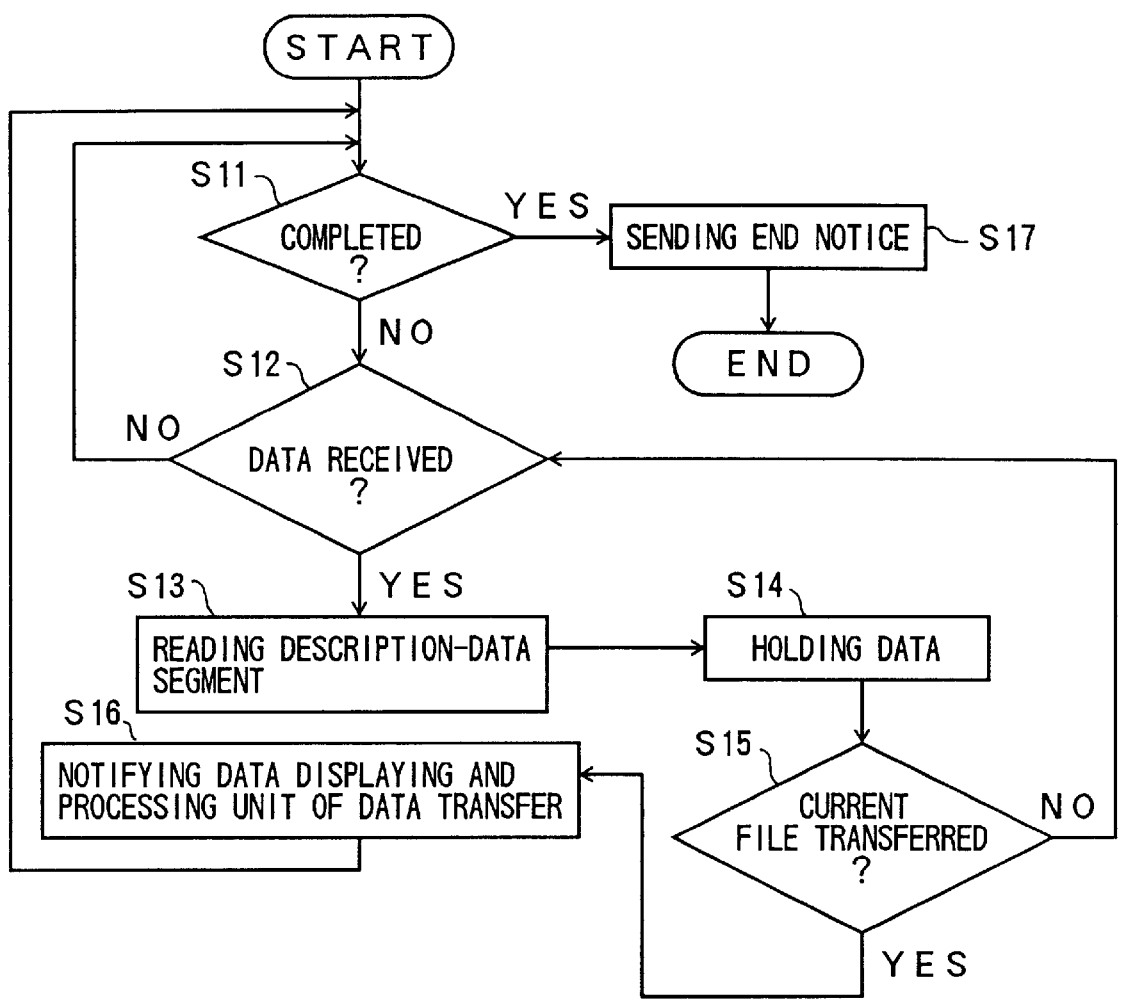
Figure 4:
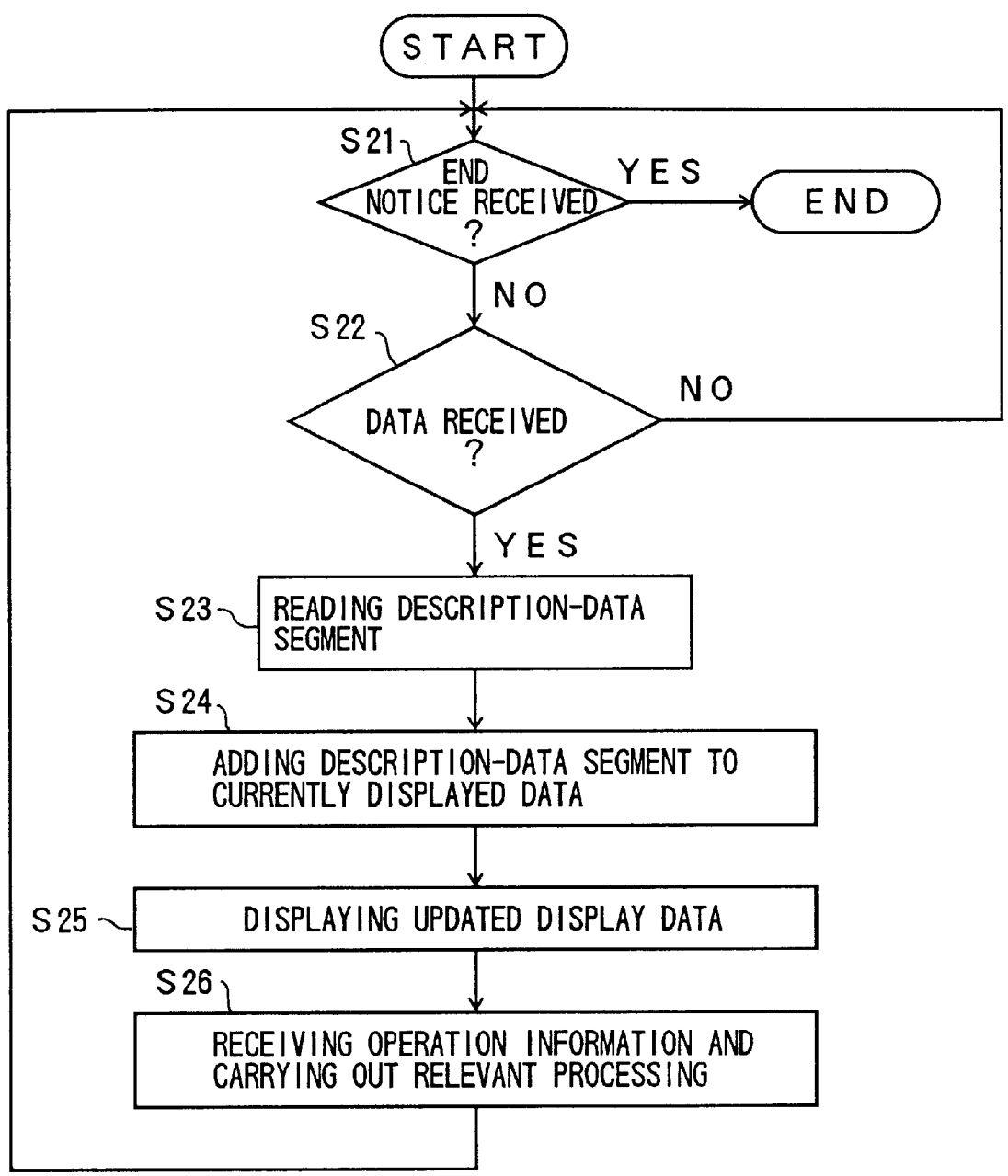

FIGS. 2 through 4 are flowcharts of a virtual-world displaying process according to the principle of the present invention. FIG. 2 shows a flowchart which is carried out by the data processing and transferring unit 12 of the server 10. FIG. 3 exhibits a flowchart performed by the data receiving unit 21 of the client 20. FIG. 4 is a flowchart of the data displaying and processing unit 22 of the client 20.

In FIG. 2, at a step S1, the data processing and transferring unit 12 reads virtual-world-description data from the virtual-world-description-data storage unit 11.

At a step S2, the data processing and transferring unit 12 divides the virtual-world-description data into a plurality of description-data segments.

At a step S3, the data processing and transferring unit 12 sends the description-data segments one by one to the client 20.

At a step S4, the data processing and transferring unit 12 checks whether the transfer of the virtual-world-description data is finished. If the data transfer is finished, the procedure goes to a step S5. Otherwise, the procedure goes back to a step S3.

At the step S5, the data processing and transferring unit 12 sends a notice of transfer completion to the client 20. This ends the procedure with regard to the data processing and transferring unit 12.

In FIG. 3, unit a step S11, the data receiving unit 21 checks whether the notice of transfer completion has been received from the server 10. If the notice of transfer completion has been received, the procedure goes to a step S17, where the data receiving unit 21 sends an end notice to the data displaying and processing unit 22 before finishing the procedure. If the notice of transfer completion has not been received by the data receiving unit 21, the procedure goes to a step S12.

At a step S12, the data receiving unit 21 checks whether data has been received. If it has, the procedure goes to a step S13. Otherwise, the procedure goes back to the step S11.

At the step S13, the data receiving unit 21 takes in the description-data segment sent from the server 10.

At a step S14, the data receiving unit 21 holds the data taken in at the step S13.

At a step S15, the data receiving unit 21 checks whether the currently transferred file is taken in up to the end of the file. If the file is received up to the end thereof, the procedure goes to a step S16. Otherwise, the procedure goes back to the step S12.

At the step S16, the data receiving unit 21 notifies the data displaying and processing unit 22 of the transfer of the description-data segment. After the step S16, the procedure goes back to the step S11.

In FIG. 4, at a step S21, the data displaying and processing unit 22 checks whether the end notice has been received from the data receiving unit 21. If the end notice has been received, the procedure ends. Otherwise, the procedure goes to a step S22.

At the step S22, the data displaying and processing unit 22 checks whether data has been received. If it has, the procedure goes to a step S23. Otherwise, the procedure returns to the step S21.

At the step S23, the data displaying and processing unit 22 takes in a description-data segment sent from the data receiving unit 21.

At a step S24, the data displaying and processing unit 22 adds the description-data segment to data which is currently displayed on a screen. That is, the data displaying and processing unit 22 adds a new description-data segment to the display data which is currently on display or is in the process of being displayed.

At a step S25, the data displaying and processing unit 22 displays the updated display data on the display screen.

At a step S26, the data displaying and processing unit 22 receives operation information from the operation unit 23 if such operation information is input, and carries out relevant processing. Processing in this case includes a shift of the viewpoint, a change in a view direction, manipulation of an object, etc.

By carrying out the processes shown in the above-described flowcharts, the virtual-world-description-data transfer system of FIG. 1 divides the virtual-world-description data into the description-data segments, sends the description-data segments one after another, and displays the transferred description-data segments one by one.

Figure 5:
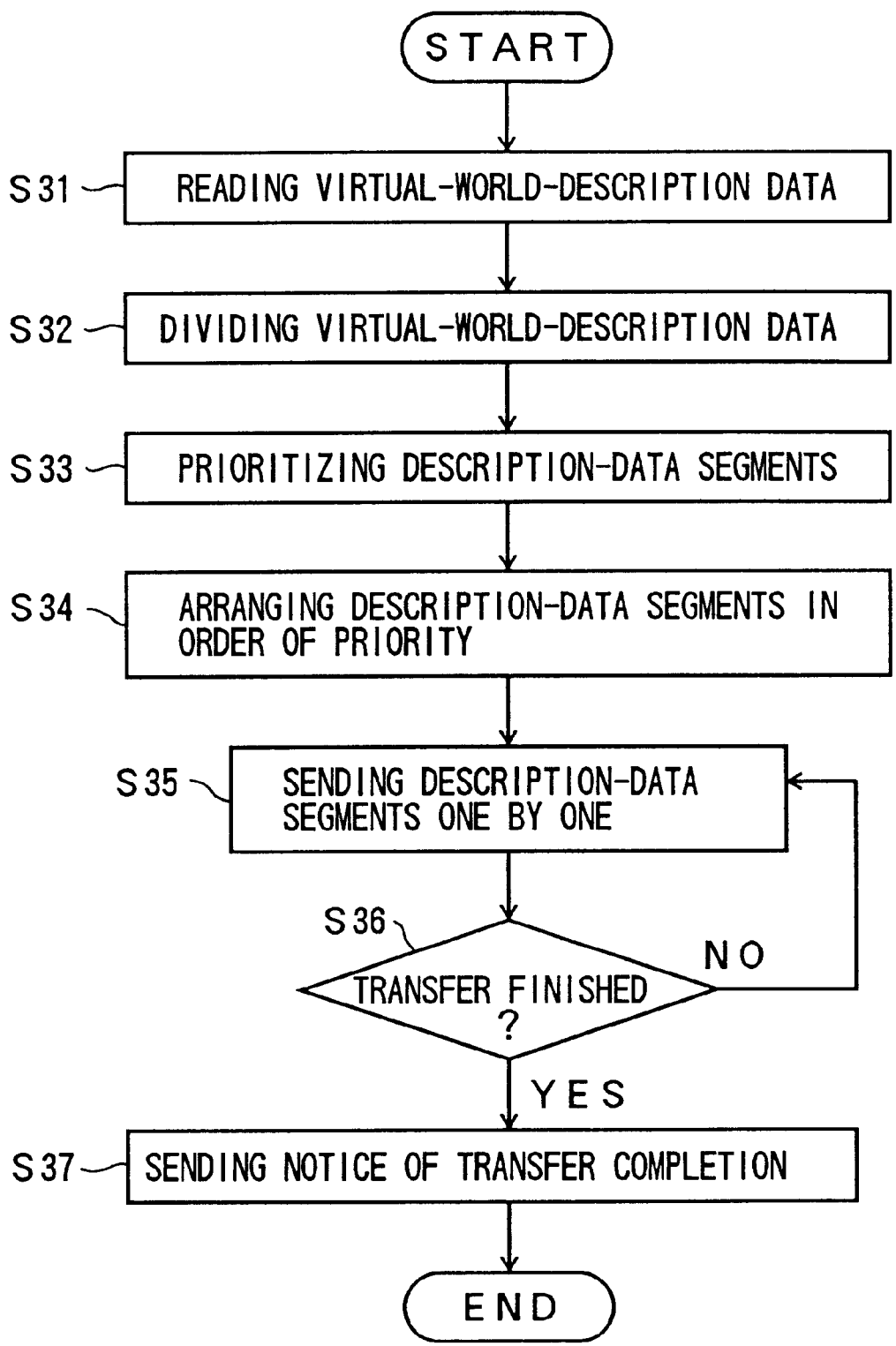
FIG. 5 is a flowchart of a process carried out by a data processing and transferring unit of a server when respective priority is given to description-data, segments in the virtual-world displaying process of the present invention.

FIG. 5 is a flowchart of a process carried out by the data processing and transferring unit 12 of the server 10 when respective priority is given to description-data segments in the virtual-world displaying process of the present invention.

In FIG. 5, at a step S31, the data processing and transferring unit 12 reads virtual-world-description data from the virtual-world-description-data storage unit 11.

At a step S32, the data processing and transferring unit 12 divides the virtual-world-description data into a plurality of description-data segments.

At a step S33, the data processing and transferring unit 12 prioritizes the description-data segments so that each of the description-data segments; has its own order of priority.

At a step S34, the data processing and transferring unit 12 arranges the description-data segments in an order of priority.

At a step S35, the data processing and transferring unit 12 sends the description-data segments one by one to the client 20 in an order of priority.

At a step S36, the data processing and transferring unit 12 checks whether the transfer of the virtual-world-description data is finished. If the data transfer is finished, the procedure goes to a step S37. Otherwise, the procedure goes back to a step S35.

At the step S37, the data processing and transferring unit 12 sends a notice of transfer completion to the client 20. This ends the procedure with regard to the data processing and transferring unit 12.

By carrying out the processes shown in the above-described flowcharts, the virtual-world-description-data transfer system of FIG. 1 divides the virtual-world-description data into the description-data segments, sends the description-data segments one after another in an order of priority, and displays the transferred description-data segments one by one according to priority.

In what follows, embodiments of the present invention will be described with reference to accompanying drawings.

FIG. 6 is a block diagram of a device which embodies the virtual-world-description-data transfer system according to the principle of the present invention. In FIG. 6, the same elements as those of FIG. 1 are referred to by the same numerals, and a description thereof will be omitted. The virtual-world-description-data transfer system of FIG. 6 includes the server 10 and the client 20. In principle, the server 10 and the client 20 have the same configuration, so that only a configuration of the client 20 is explicitly shown in FIG. 6.

The client 20 includes a CPU 31, a RAM 32, a ROM 33, interfaces 34 and 35, and a secondary memory 36, which together make up a computer. The client 20 further includes a display 41, an input device 42, an external memory device 43, and a memory medium 44 pursuant to the external memory device 43. The data receiving unit 21, the data displaying and processing unit 22, and the operation unit 23 of FIG. 1 are embodied by the CPU 31 when the CPU 31 executes software programs to control the interfaces 34 and 35, the display 41, and the input device 42. The software programs are provided via the memory medium 44 such as a floppy disk, CD-ROM, or the like.

Alternately, the software programs are provided from a memory medium at a remote site via a communication line or an information network to which the client 20 is connected to.

The software programs are read from the memory medium 44, and are stored in the secondary memory 36 via the external memory device 43. The CPU 31 loads programs stored in the secondary memory 36 into the memory space of the RAM 32 before executing the programs. The ROM 33 stores basic programs for controlling the computer. The display 41 is used for displaying the virtual-world-description data. The input device 42 is used for receiving user input inclusive of operation information, and is comprised of devices such as a keyboard and a mouse.

The client 20 is connected to the server 10 via a network 45, which is attached to and extends from the interface 35. The client 20 receives description-data segments one after another from the server 10 via the network 45. The server 10 may be comprised of a computer having the same structure as that of the client 20.

A configuration shown in FIG. 6 is only an example of a system according to the present invention, and the present invention is not limited to this configuration.

FIG. 7 is an illustrative drawing showing an example of the virtual-world-description data which is stored in the virtual-world-description-data storage unit 11. In the example of FIG. 7, the virtual world is comprised of three objects.

Virtual-world-description data 50 includes viewpoint information indicating a position of the viewpoint, an object description 1 describing a first object, an object description 2 describing a second object, and an object description 3 describing a third object. Each object description includes coordinate-transformation information, a description of attributes, and a description of shape. The coordinate-transformation information defines a position of the object regarding where the object is located and how the object is placed, and represents relationships between the object coordinates and the world coordinates. The description of attributes defines attributes such as a color and texture with regard to each polygon making up the object. The description of shape includes coordinate information specifying a shape of each polygon making up the object, and, for example, includes three-dimensional coordinates of apexes of each polygon.

Figure 8:
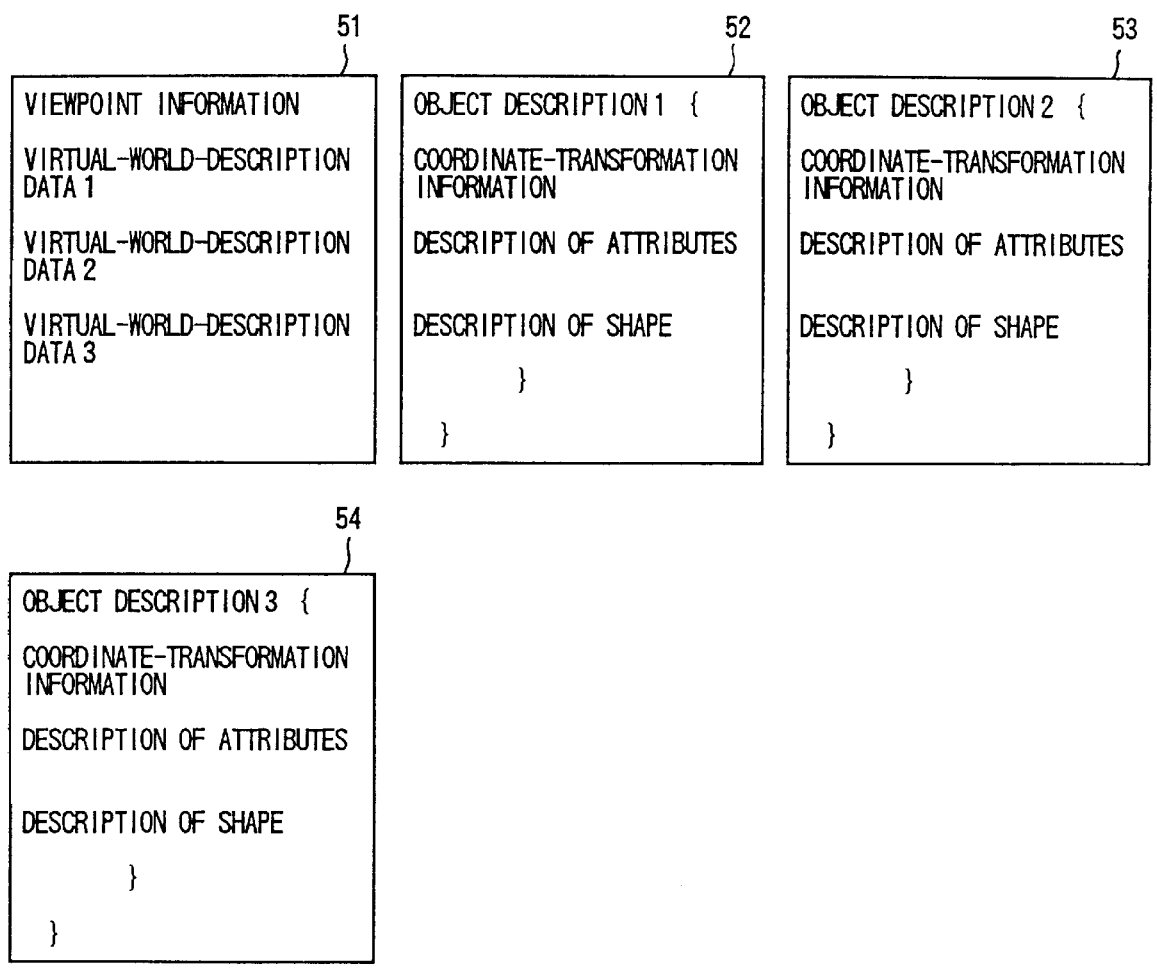
FIG. 8 is an illustrative drawing showing an example of description-data segments when the virtual-worlddescription data is divided by the data processing and transferring unit of the server.

FIG. 8 is an illustrative drawing showing an example of description-data segments when the virtual-world-description data 50 is divided by the data processing and transferring unit 12.

As shown in FIG. 8, the divided virtual-world-description data includes description-data segments 51 through 54. The description-data segment 51 includes viewpoint information and other data which indicates that the object descriptions 1 through 3 are included as the virtual-world-description data. The description-data segments 52 through 54 include the object descriptions 1 through 3, respectively, each of which includes coordinate-transformation information, a description of attributes, and a description of shape with respect to a respective object.

In this manner, the data processing and transferring unit 12 divides the virtual-world-description data 50 into the description-data segments 51 through 54, and sends the description-data segments 51 through 54 to the data receiving unit 21. The data displaying and processing unit 22 learns where the view point is and how many objects are included in the virtual world based on the description-data segment 51 received via the data receiving unit 21. Further, the data displaying and processing unit 22 displays transferred objects one by one based on positions, shapes, colors, textures, etc. of these objects which are specified in the description-data segments 52 through 54 received one after another.

Figure 9:
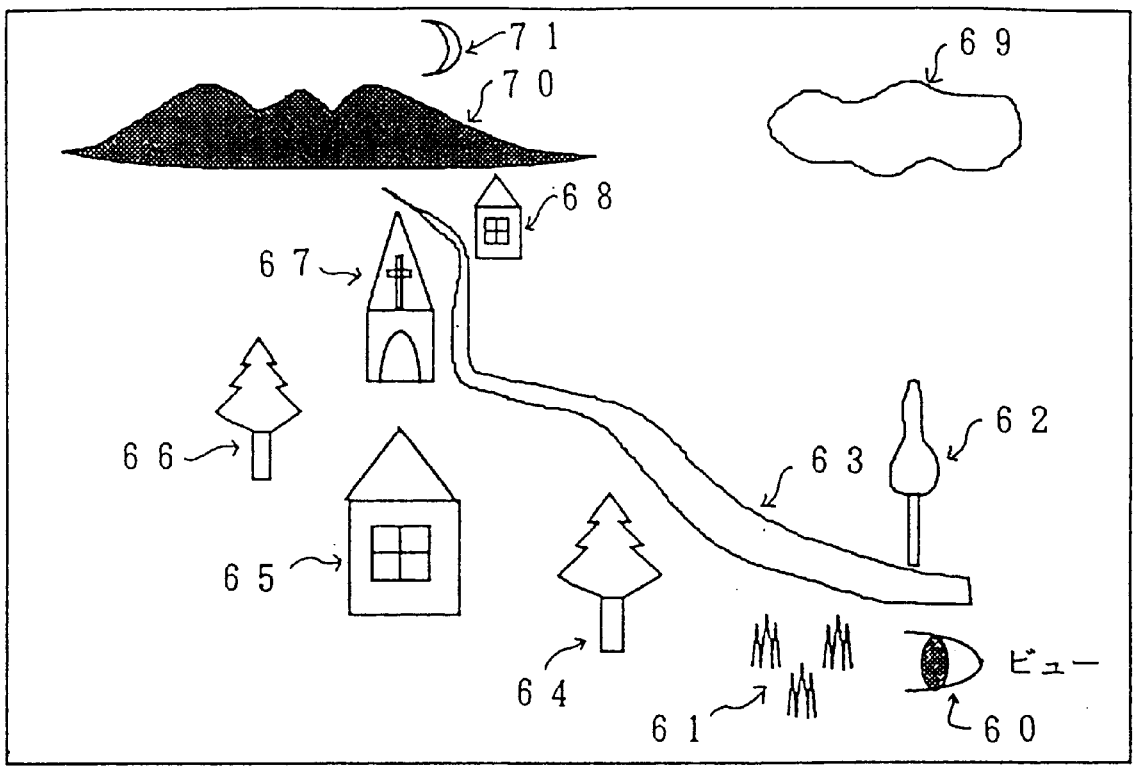
FIG. 9 is an illustrative drawing which shows an example of a virtual world constructed in a computer.

FIG. 9 is an illustrative drawing which shows an example of a virtual world constructed in a computer. This virtual world includes a viewpoint 60, weeds 61, a first tree 62, a road 63, a second tree 64, a first house 65, a third tree 66, a church 67, a second house 68, a cloud 69, a mountain 70, and a moon 71. Each of the above objects is represented by a plurality of polygons, wherein the virtual-world-description data defines a position of a given object, and further defines a shape, a color, texture, etc. of each polygon.

According to the principle of the present invention, the virtual-world-description data is divided into such objects as the weeds 61, the first tree 62, the road 63, etc., and each of the description-data segments is transferred as a single separate file. Conventional technique displays the virtual world after all the virtual-world-description data is finished to be transferred as a single file, so that a user has to wait until the virtual world of FIG. 9 is displayed on a screen. In the present invention, the description-data segments are transferred and displayed one by one, so that each of the weeds 61, the first tree 62, the road 63, etc. is immediately displayed when it is transferred. Further, the user can manipulate (or operate) an object which has been already displayed.

The example of the virtual world shown in FIG. 9 will be repeatedly used in the following description of embodiments as such a need arises.

Figure 10:
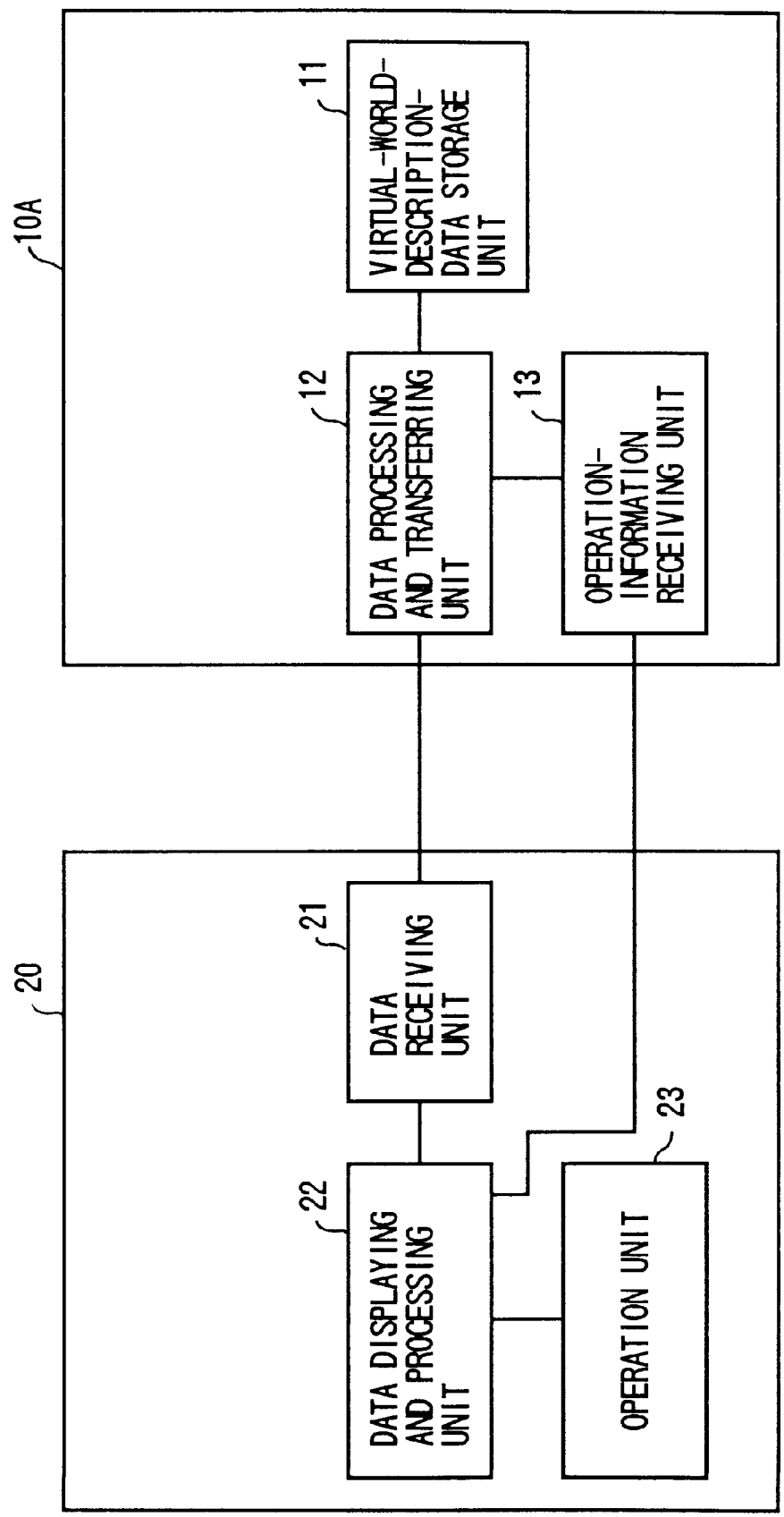
FIG. 10 is a block diagram of a first embodiment of the virtual-world-description-data transfer system according to the present invention.

FIG. 10 is a block diagram of a first embodiment of the virtual-world-description-data transfer system according to the present invention. In FIG. 10, the same elements as those of FIG. 1 are referred to by the same numerals, and a description thereof will be omitted.

The virtual-world-description-data transfer system of FIG. 10 includes a server 10A and the client 20. The server 10A includes the virtual-world-description-data storage unit 11, the data processing and transferring unit 12, and an operation-information receiving unit 13. The client 20 includes the data receiving unit 21, the data displaying and processing unit 22, and the operation unit 23.

The operation-information receiving unit 13 of the server 10A receives operation information from the data displaying and processing unit 22 of the client 20 when the operation information is input by a user to the operation unit 23 of the client 20. In the first embodiment, the operation-information receiving unit 13 receives information about the initial viewpoint, i.e., a position of the viewpoint at an initial state, and supplies this information to the data processing and transferring unit 12.

The data processing and transferring unit 12 divides the virtual-world-description data into a plurality of description-data segments. The data processing and transferring unit 12 further obtains a distance between the initial viewpoint and each object represented by a corresponding description-data segment, and give a priority level to each of the description-data segments. According to this priority level, the data processing and transferring unit 12 sends the description-data segments one after another. The operation of the client 20 is the same as that in the case of FIG. 1, and a description thereof will be omitted.

A distance between the viewpoint and a given description-data segment may be obtained by measuring a distance between the viewpoint and an apex first in the list of polygons. Alternately, a distance may be obtained with respect to a polygon which is positioned in a view direction extending from the viewpoint.

With reference again to FIG. 9, if the viewpoint 60 is the initial viewpoint, each object is closer to the viewpoint in an order of the road 63, the weeds 61, the first tree 62, the second tree 64, . . . . Thus, priority is given in this order. These objects are transferred and displayed in the order of priority. Namely, the road 63 is displayed first. Then, the weeds 61 is displayed, and the following objects are displayed one after another in the order of priority. Even if all the objects are not yet displayed, the user can manipulate (or operate) an object such as the road 63 which has been already displayed.

Figure 11:
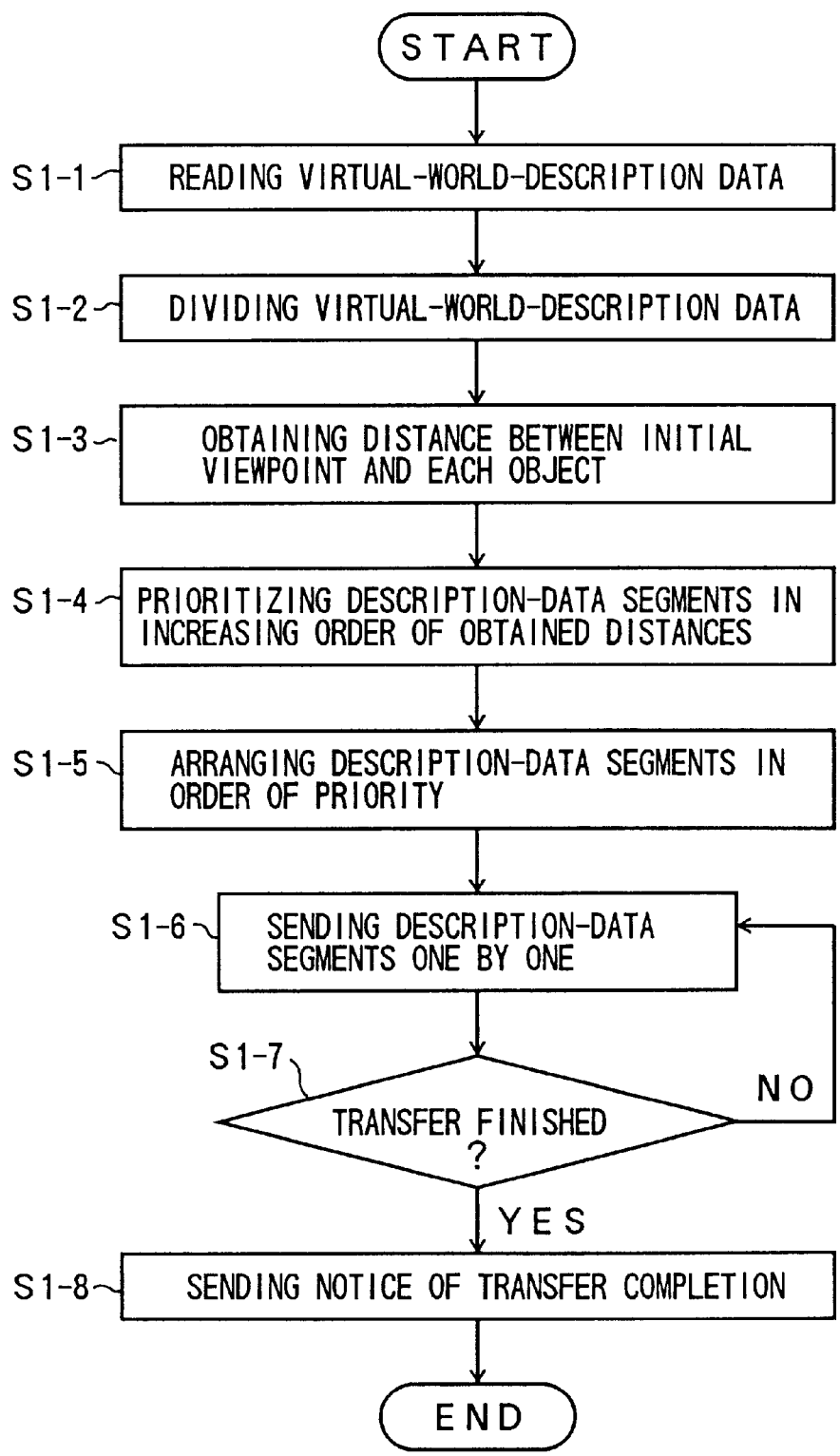
FIG. 11 is a flowchart of a process carried out by the data processing and transferring unit of the server in the first embodiment.

FIG. 11 is a flowchart of a process carried out by the data processing and transferring unit 12 of the server 10A in the first embodiment.

In FIG. 11, at a step S1-1, the data processing and transferring unit 12 reads virtual-world-description data from the virtual-world-description-data storage unit 11.

At a step S1-2, the data processing and transferring unit 12 divides the virtual-world-description data into a plurality of description-data segments.

At a step S1-3, the data processing and transferring unit 12 obtains a distance between the initial viewpoint and each of the description-data segments.

At a step S1-4, the data processing and transferring unit 12 prioritizes the description-data segments in an increasing order of the obtained distances.

At a step S1-5, the data processing and transferring unit 12 arranges the description-data segments in the order of priority.

At a step S1-6, the data processing and transferring unit 12 sends the description-data segments one by one to the client 20 in the order of priority.

At a step S1-7, the data processing and transferring unit 12 checks whether the transfer of the virtual-world-description data is finished. If the data transfer is finished, the procedure goes to a step S1-8. Otherwise, the procedure goes back to the step S1-6.

At the step S1-8, the data processing and transferring unit 12 sends a notice of transfer completion to the client 20. This ends the procedure with regard to the data processing and transferring unit 12.

By carrying out the process shown in the above-described flowchart, the virtual-world-description-data transfer system of the first embodiment divides the virtual-world-description data into the description-data segments, and sends and displays the description-data segments one after another in an increasing order of distances from the viewpoint. At the same time, the virtual-world-description-data transfer system allows the user to manipulate (or operate) an object which has been already displayed.

Figure 12:
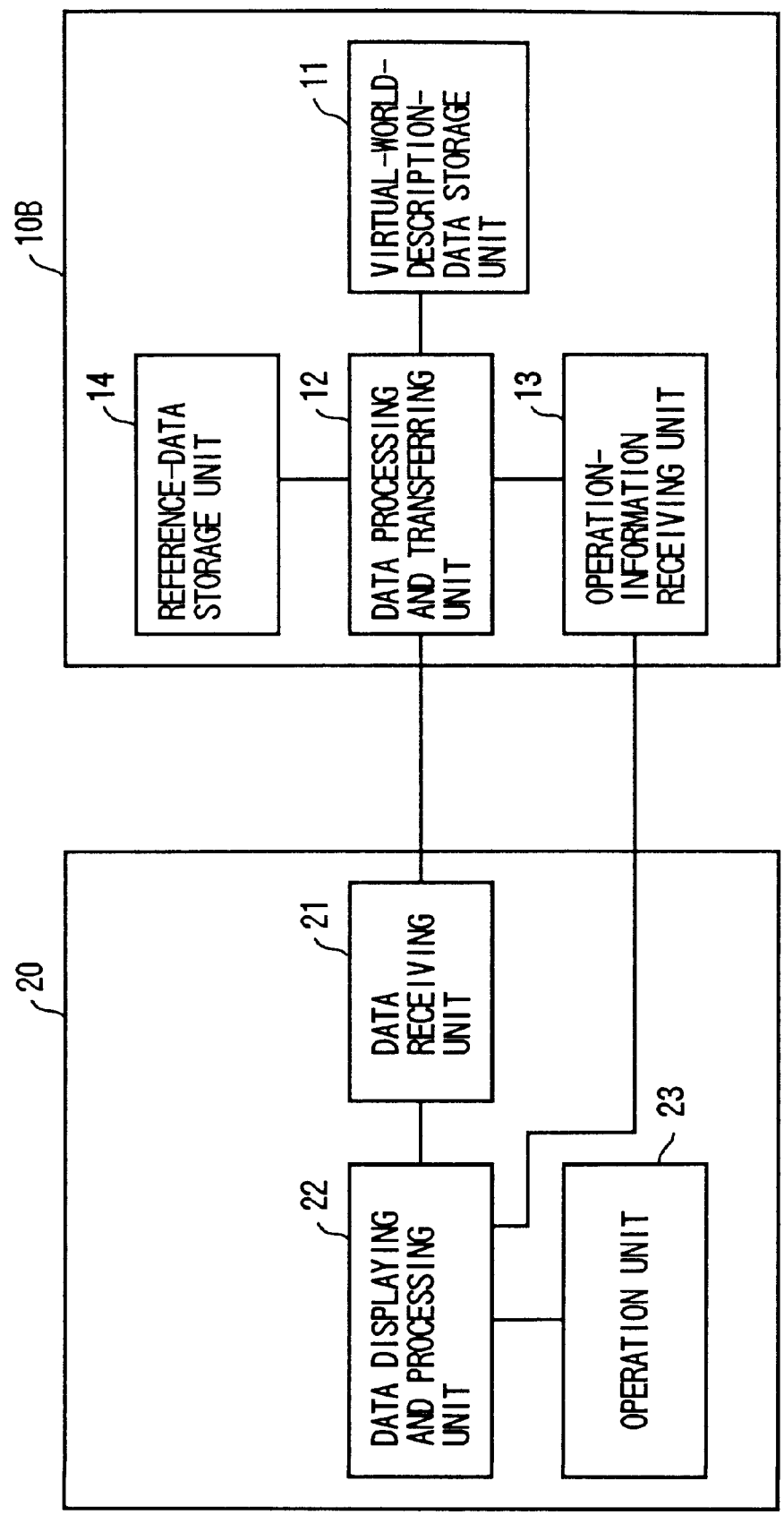
FIG. 12 is a block diagram of a second embodiment of the virtual-world-description-data transfer system according to the present invention.

FIG. 12 is a block diagram of a second embodiment of the virtual-world-description-data transfer system according to the present invention. In FIG. 12, the same elements as those of FIG. 10 are referred to by the same numerals, and a description thereof will be omitted.

The virtual-world-description-data transfer system of FIG. 12 includes a server 10B and the client 20. The server 10B includes the virtual-world-description-data storage unit 11, the data processing and transferring unit 12, the operation-information receiving unit 13, and a reference-data storage unit 14. The client 20 includes the data receiving unit 21, the data displaying and processing unit 22, and the operation unit 23.

The operation-information receiving unit 13 of the server 10B receives operation information from the data displaying and processing unit 22 of the client 20 when the operation information is input by a user to the operation unit 23 of the client 20. In the second embodiment, the operation-information receiving unit 13 receives information about shift of the viewpoint, selection of objects, etc. The operation-information receiving unit 13 supplies this information to the data processing and transferring unit 12.

The data processing and transferring unit 12 counts up the number of occurrence each time the viewpoint approaches a given object to come into a predetermined proximity range or each time the given object is selected, and stores the number of occurrence as the number of references in the reference-data storage unit 14. When the transfer of virtual-world-description data is requested next time, the data processing and transferring unit 12 first receives the initial viewpoint from the operation-information receiving unit 13. The data processing and transferring unit 12 then divides the virtual-world-description data into a plurality of description-data segments, and prioritize the description-data segments in a descending order of the number of references. According to this priority order, the data processing and transferring unit 12 sends the description-data segments one after another. The operation of the client 20 is the same as that in the case of FIG. 1, and a description thereof will be omitted.

With reference again to FIG. 9, assume that the church 67 has the greatest number of past references, and that the first house 65 has the second greatest number of references. In this case, priority is given in an order of the church 67, the first house 65, . . . . These objects are transferred and displayed in this order of priority. Namely, the church 67 is displayed first. Then, the first house 65 is displayed, and the following objects are displayed one after another in the order of priority. Even if all the objects are not yet displayed, the user can manipulate (or operate) an object such as the church 67 which has been already displayed.

Figure 13:
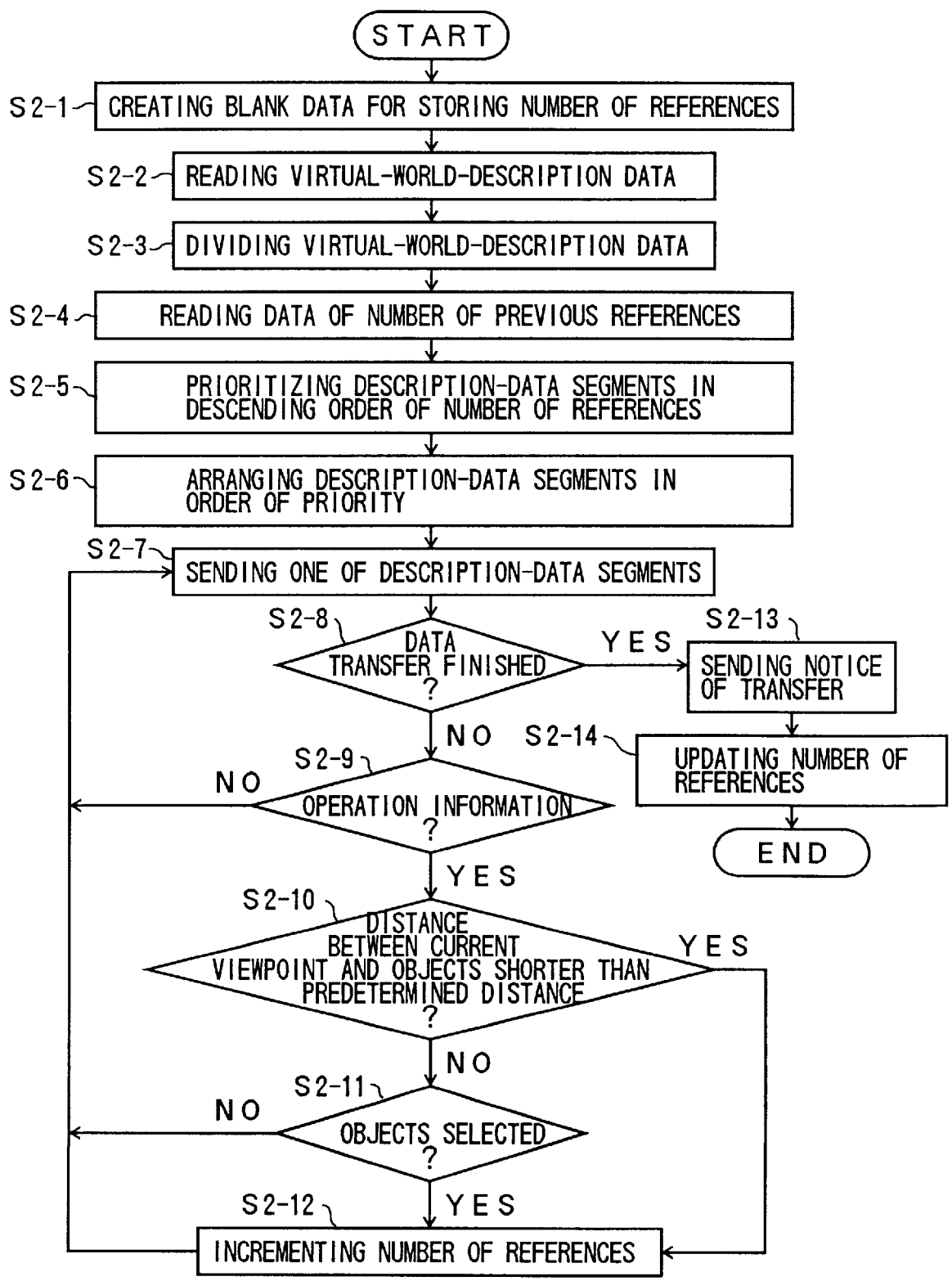
FIG. 13 is a flowchart of a process carried out by the data processing and transferring unit of the server in the second embodiment.

FIG. 13 is a flowchart of a process carried out by the data processing and transferring unit 12 of the server 10B in the second embodiment.

In FIG. 13, at a step S2-1, the data processing and transferring unit 12 creates blank data of the number of references which are to be newly recorded. The newly recorded data of the number of references will be used for updating the previous data of the number of references at the end of the procedure shown in FIG. 13.

At a step S2-2, the data processing and transferring unit 12 reads virtual-world-description data from the virtual-world-description-data storage unit 11.

At a step S2-3, the data processing and transferring unit 12 divides the virtual-world-description data into a plurality of description-data segments.

At a step S2-4, the data processing and transferring unit 12 reads data of the number of previous references from the reference-data storage unit 14.

At a step S2-5, the data processing and transferring unit 12 prioritizes the description-data segments in a descending order of the number of references.

At a step S2-6, the data processing and transferring unit 12 arranges the description-data segments in an order of priority.

At a step S2-7, the data processing and transferring unit 12 sends one of the description-data segments to the client 20 according to the order of priority.

At a step S2-8, the data processing and transferring unit 12 checks whether the transfer of the virtual-world-description data is finished. If the data transfer is finished, the procedure goes to a step S2-13. Otherwise, the procedure goes to a step S2-9.

At a step S2-9, the data processing and transferring unit 12 checks whether the operation-information receiving unit 13 has received operation information from the client 20. If there is such operation information, the procedure goes to a step S2-10. Otherwise, the procedure goes back to the step S2-7.

At the step S2-10, the data processing and transferring unit 12 checks whether a distance between the current viewpoint and each of the description-data segments is shorter than a predetermined distance. If the distance is shorter than the predetermined distance, the procedure goes to a step S2-12. Otherwise, the procedure goes to a step S2-11.

At the step S2-11, the data processing and transferring unit 12 checks whether any one of the transferred data has been selected. If it has, the procedure goes to the step S2-12. Otherwise, the procedure goes back to the step S2-7.

At the step S2-12, the data processing and transferring unit 12 increments the number of references (the newly recorded data of the number of references) by 1 with respect to description-data segments which have been selected or have a distance with the viewpoint shorter than the predetermined distance. After this step, the procedure goes back to the step S2-7.

At the step S2-13 which is carried out after the completion of transfer, the data processing and transferring unit 12 sends a notice of transfer completion to the client 20.

At a step S2-14, the data processing and transferring unit 12 updates the number of references in the reference-data storage unit 14 with the newly recorded data of the number of references. This ends the procedure with regard to the data processing and transferring unit 12.

By carrying out the process shown in the above-described flowchart, the virtual-world-description-data transfer system of the second embodiment divides the virtual-world-description data into the description-data segments, and sends and displays the description-data segments one after another in a descending order of the number of references. At the same time, the virtual-world-description-data transfer system allows the user to manipulate (or operate) an object which has been already displayed. Prioritization based on the number of references makes it possible to display particular objects ahead of other objects when the particular objects are likely to be approached or manipulated than other objects.

In what follows, embodiments in which different rules of prioritization are used will be described.

A third embodiment of the virtual-world-description-data transfer system of the present invention prioritizes each object according to the size of each object. In the third embodiment, the virtual-world-description-data transfer system having the same configuration as that of FIG. 10 will be used.

The third embodiment will be described belong with reference to FIG. 10. The data processing and transferring unit 12 divides the virtual-world-description data into a plurality of description-data segments. The data processing and transferring unit 12 further obtains a physical size of each object as it is obtained when shape data of the description-data segments is placed in the virtual world, and gives a priority level to each of the description-data segments in a decreasing order of physical size. According to this priority level, the data processing and transferring unit 12 sends the description-data segments one after another. The operation of the client 20 is the same as that in the case of FIG. 1, and a description thereof will be omitted.

With reference again to FIG. 9, assume that the physical size of each object is bigger in an order of the moon 71, the mountain 70, the cloud 69, the church 67, the first tree 62, ..., with the biggest being the first. Priority is given in this order. These objects are transferred and displayed in this order of priority. Namely, the moon 71 is displayed first. Then, the mountain 70 is displayed, and the following objects are displayed one after another in the order of priority. Even if all the objects are not yet displayed, the user can manipulate (or operate) an object such as the mountain 70 which has been already displayed.

Figure 14:
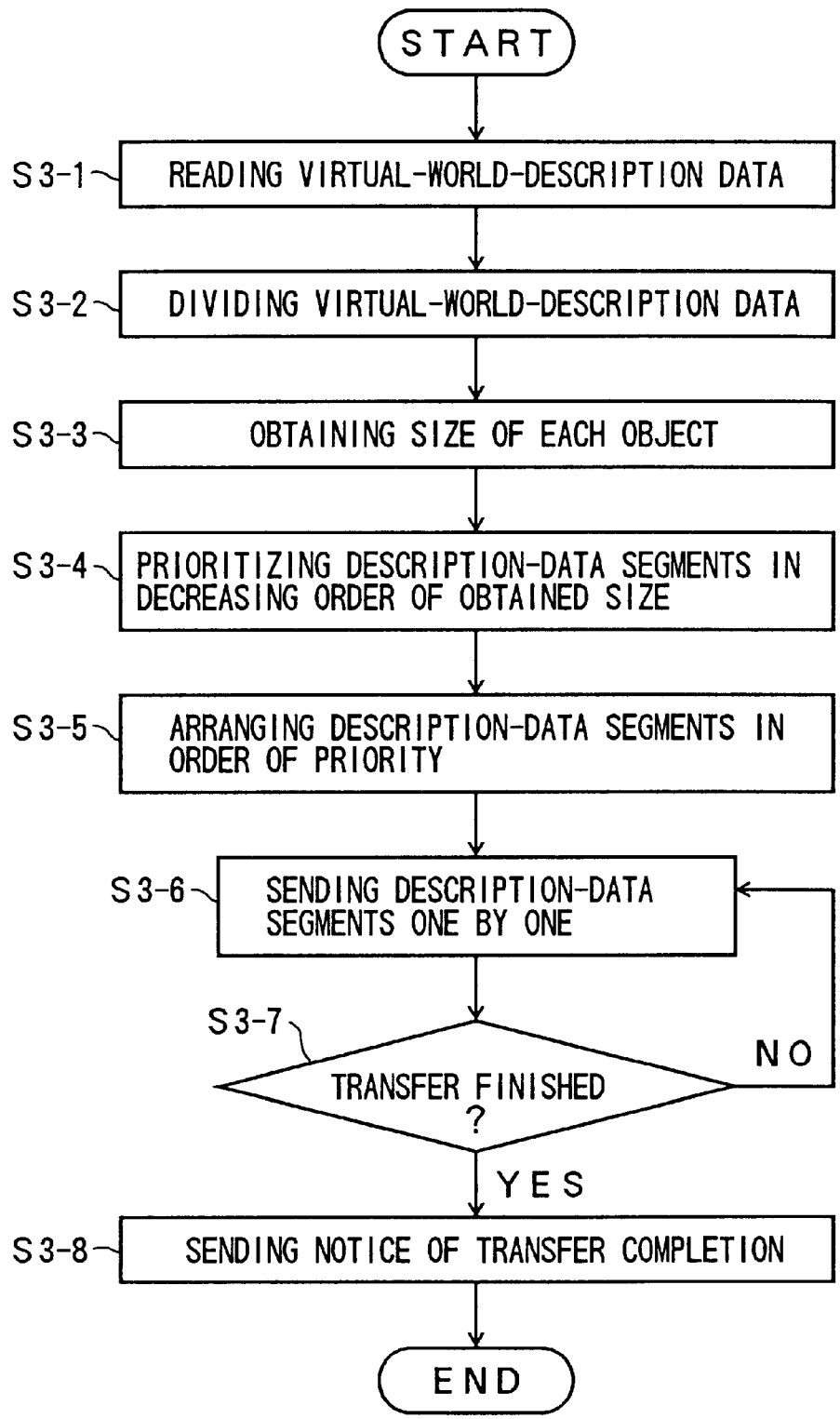
FIG. 14 is a flowchart of a process carried out by the data processing and transferring unit of the server in the third embodiment.

FIG. 14 is a flowchart of a process carried out by the data processing and transferring unit 12 of the server 10A in the third embodiment.

In FIG. 14, at a step S3-1, the data processing and transferring unit 12 reads virtual-world-description data from the virtual-world-description-data storage unit 11.

At a step S3-2, the data processing and transferring unit 12 divides the virtual-world-description data into a plurality of description-data segments.

At a step S3-3, the data processing and transferring unit 12 obtains a size of each object defined by the description-data segments.

At a step S3-4, the data processing and transferring unit 12 prioritizes the description-data segments in a decreasing order of the obtained size.

At a step S3-5, the data processing and transferring unit 12 arranges the description-data segments in the order of priority.

At a step S3-6, the data processing and transferring unit 12 sends the description-data segments one by one to the client 20 in the order of priority.

At a step S3-7, the data processing and transferring unit 12 checks whether the transfer of the virtual-world-description data is finished. If the data transfer is finished, the procedure goes to a step S3-8. Otherwise, the procedure goes back to the step S3-6.

At the step S3-8, the data processing and transferring unit 12 sends a notice of transfer completion to the client 20. This ends the procedure with regard to the data processing and transferring unit 12.

By carrying out the process shown in the above-described flowchart, the virtual-world-description-data transfer system of the third embodiment divides the virtual-world-description data into the description-data segments, and sends and displays the description-data segments one after another in a decreasing order of physical sizes of the objects. At the same time, the virtual-world-description-data transfer system allows the user to manipulate (or operate) an object which has been already displayed.

The above description has been provided with regard to a case in which physical size is used in prioritization. Alternately, an appeared size viewed from the viewpoint may be calculated so as to prioritize each object. Namely, priority may be given in accordance with a displayed size of each object displayed on a screen. Prioritization based on the appeared size of each object makes it possible to display larger and more conspicuous objects ahead of other objects, so that the user can manipulate (or operate) such larger and more conspicuous objects earlier than otherwise.

A fourth embodiment of the virtual-world-description-data transfer system of the present invention prioritizes each object according to an altitude of each object. In the fourth embodiment, the virtual-world-description-data transfer system having the same configuration as that of FIG. 10 will be used.

The fourth embodiment will be described below with reference to FIG. 10. The data processing and transferring unit 12 divides the virtual-world-description data into a plurality of description-data segments. The data processing and transferring unit 12 further obtains a physical altitude of each object as it is obtained when shape data of the description-data segments is placed in the virtual world, and gives a priority level to each of the description-data segments in an increasing order of altitude gaps between the viewpoint and the objects. According to this priority level, the data processing and transferring unit 12 sends the description-data segments one after another. The operation of the client 20 is the same as that in the case of FIG. 1, and a description thereof will be omitted.

With reference again to FIG. 9, lower priority levels are given to objects such as the cloud 69 and the moon 71, which are higher in altitude, as well as the weeds 61 which is lower in altitude. When objects are transferred and displayed in the order of priority, objects such as the cloud 69, the moon 71, and the weeds 61 will be displayed after other objects are displayed. Even if the cloud 69, the moon 71, and the weeds 61 are not yet displayed, the user can manipulate (or operate) an object which has been already displayed.

Figure 15:
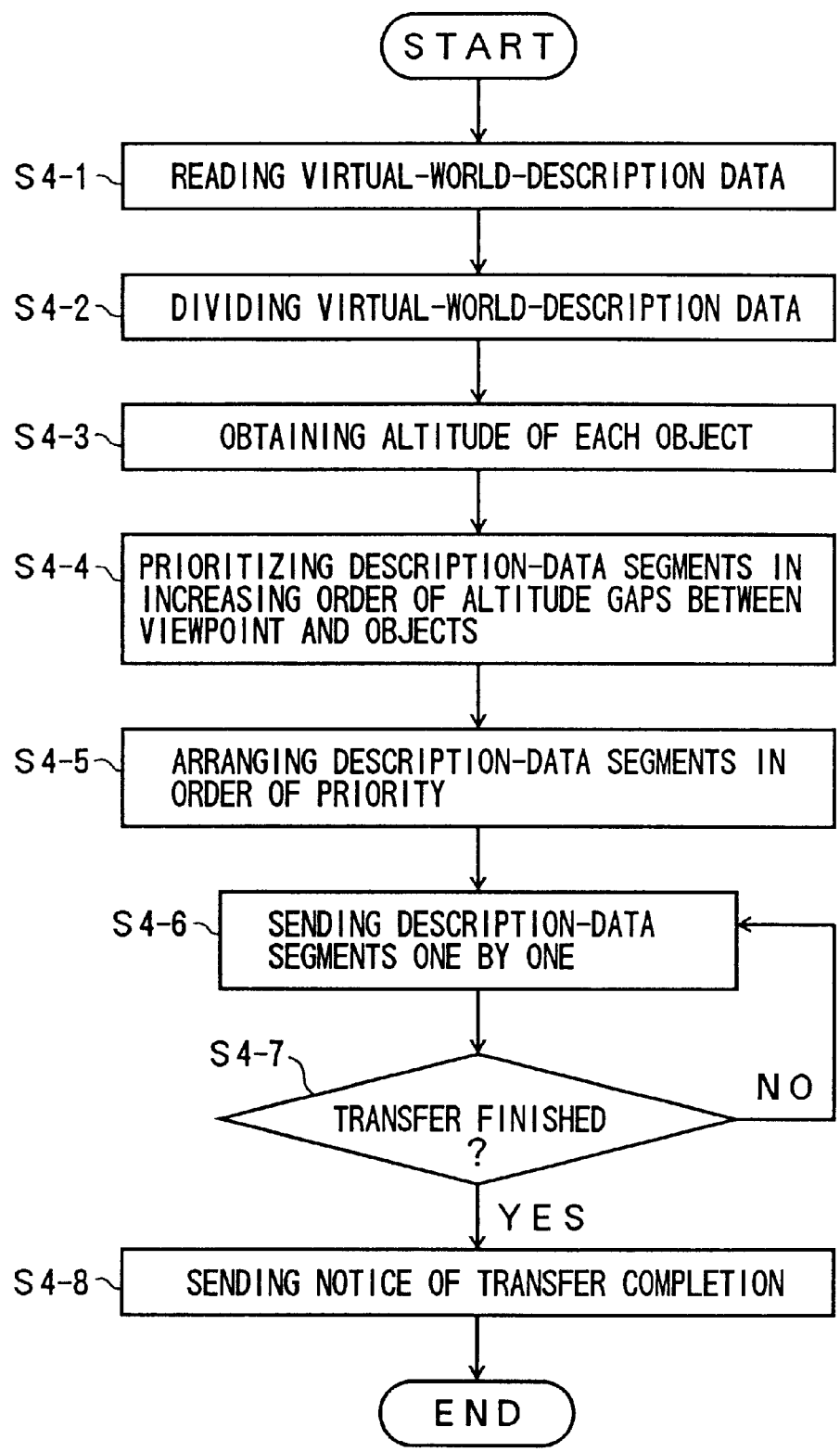
FIG. 15 is a flowchart of a process carried out by the data processing and transferring unit of the server in the fourth embodiment.

FIG. 15 is a flowchart of a process carried out by the data processing and transferring unit 12 of the server 10A in the fourth embodiment.

In FIG. 15, at a step S4-1, the data processing and transferring unit 12 reads virtual-world-description data from the virtual-world-description-data storage unit 11.

At a step S4-2, the data processing and transferring unit 12 divides the virtual-world-description data into a plurality of description-data segments.

At a step S4-3, the data processing and transferring unit 12 obtains an altitude of each object of the description-data segments.

At a step S4-4, the data processing and transferring unit 12 prioritizes the description-data segments in an increasing order of the altitude gaps between the viewpoint and the objects.

At a step S4-5, the data processing and transferring unit 12 arranges the description-data segments in the order of priority.

At a step S4-6, the data processing and transferring unit 12 sends the description-data segments one by one to the client 20 in the order of priority.

At a step S4-7, the data processing and transferring unit 12 checks whether the transfer of the virtual-world-description data is finished. If the data transfer is finished, the procedure goes to a step S4-8. Otherwise, the procedure goes back to the step S4-6.

At the step S4-8, the data processing and transferring unit 12 sends a notice of transfer completion to the client 20. This ends the procedure with regard to the data processing and transferring unit 12.

By carrying out the process shown in the above-described flowchart, the virtual-world-description-data transfer system of the fourth embodiment divides the virtual-world-description data into the description-data segments, and sends and displays the description-data segments one after another in an increasing order of altitude gaps between the viewpoint and the objects. At the same time, the virtual-world-description-data transfer system allows the user to manipulate (or operate) an object which has been already displayed. In this manner, objects which are likely to come into the view ahead of other objects are displayed earlier, and can be manipulated before other objects are displayed.

The above description has been provided with regard to a case in which an altitude gap between the viewpoint and each object is used in prioritization. Alternately, priority may be defined based on an altitude gap between an object and a height of a view vector at the position of the object. Namely, when the view is directed upward, objects having high altitudes will be transferred and displayed ahead of other objects. This makes it possible to display objects which are likely to come into the view first, depending on the direction of the view, and allows the user to manipulate (or operate) the displayed objects earlier than otherwise.

A fifth embodiment of the virtual-world-description-data transfer system of the present invention prioritizes each object according to the level of importance of each object. In the fifth embodiment, the virtual-world-description-data transfer system having the same configuration as that of FIG. 10 will be used.

The fifth embodiment will be described below with reference to FIG. 10. The data processing and transferring unit 12 divides the virtual-world-description data into a plurality of description-data segments. The data processing and transferring unit 12 gives a priority level to each of the description-data segments in a decreasing order of the level of importance, which is defined beforehand with respect to each of the description-data segments. According to this priority level, the data processing and transferring unit 12 sends the description-data segments one after another. The operation of the client 20 is the same as that in the case of FIG. 1, and a description thereof will be omitted.

Figure 16:
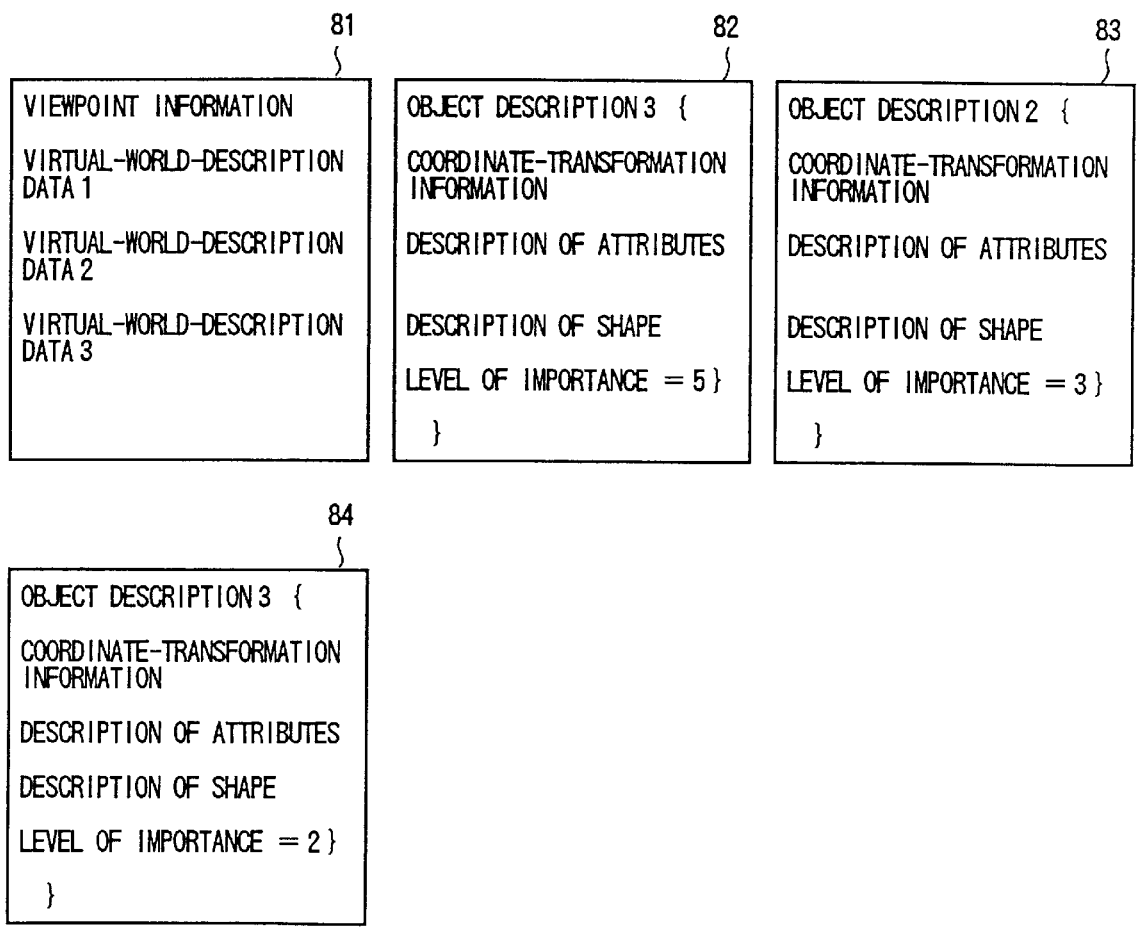
FIG. 16 is an illustrative drawing showing an example of description-data segments into which the virtual-world-description data is divided.

FIG. 16 is an illustrative drawing showing an example of description-data segments into which the virtual-world-description data is divided. The divided virtual-world-description data of FIG. 16 includes description-data segments 81 through 84. The description-data segments 81 through 84 of FIG. 16 are the description-data segments 51 through 54 of FIG. 8, respectively, in combination with attached respective levels of importance. The levels of importance are assigned to the virtual-world-description data prior to the division. When the virtual-world-description data is created, the designer defines levels of importance with regard to each object by taking into consideration factors such as expected frequency of references and criteria of how important a given object is in order to grasp the entire picture of the virtual world. Details of how to define the levels of importance are a matter of design choice in practice, and a description thereof will be omitted.

With reference again to FIG. 9, if the road 63 is regarded as important, for example, in order to grasp the structure of the virtual world, the road 63 is given a high level of importance. If the church 67 is expected to have high frequency of references, for example, the church 67 is also given a high level of importance. When objects are transferred and displayed in the order of priority, the road 63 and the church 67 will be displayed ahead of other objects. Even if all the objects are not yet displayed, the user can manipulate (or operate) objects such as the road 63 and the church 67 which have been already displayed.

Figure 17:
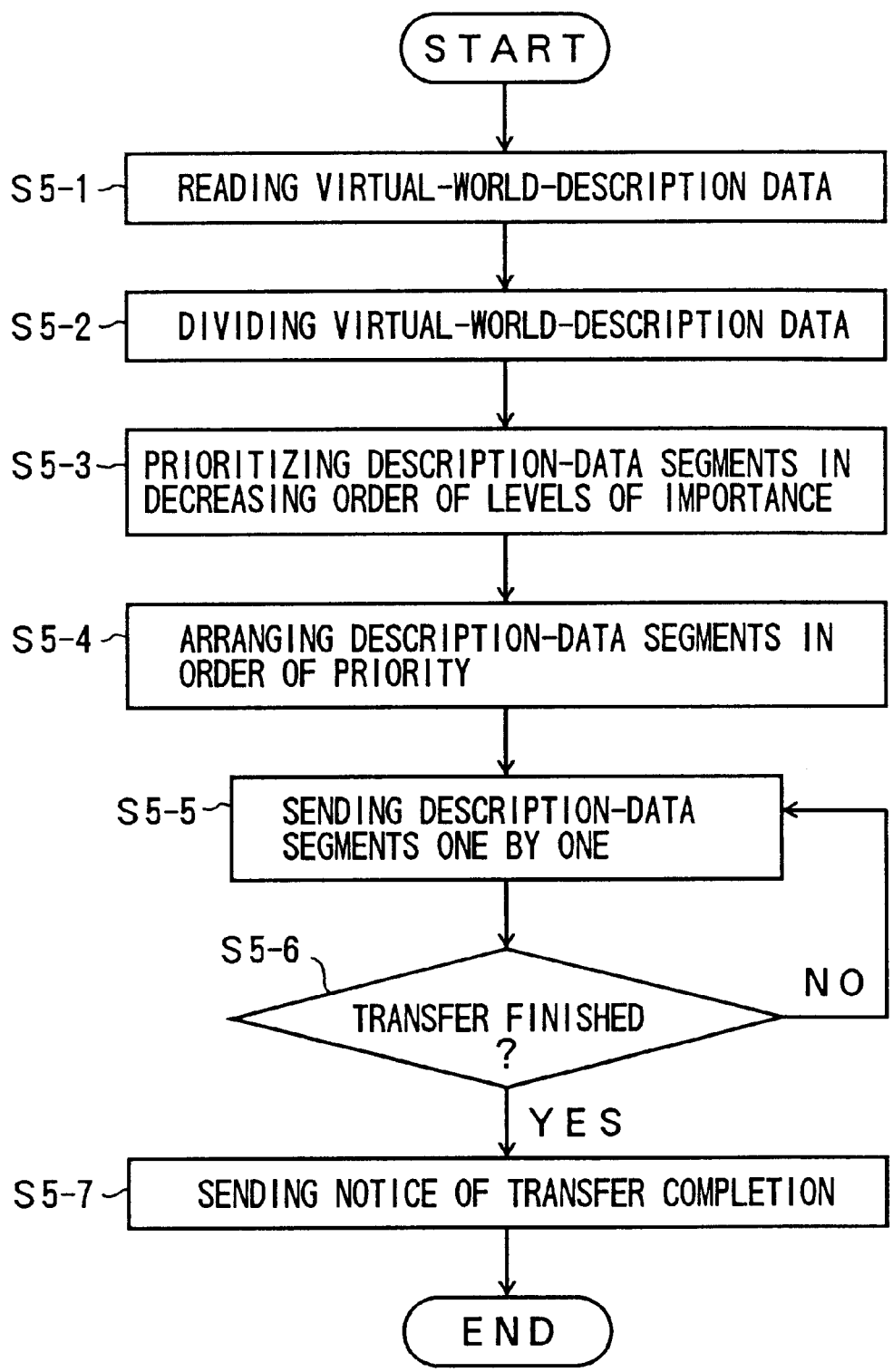
FIG. 17 is a flowchart of a process carried out by the data processing and transferring unit of the server in the fifth embodiment.

FIG. 17 is a flowchart of a process carried out by the data processing and transferring unit 12 of the server 10A in the fifth embodiment.

In FIG. 17, at a step S5-1, the data processing and transferring unit 12 reads virtual-world-description data from the virtual-world-description-data storage unit 11.

At a step S5-2, the data processing and transferring unit 12 divides the virtual-world-description data into a plurality of description-data segments.

At a step S5-3, the data processing and transferring unit 12 prioritizes the description-data segments in a decreasing order of levels of importance, which are defined in advance.

At a step S5-4, the data processing and transferring unit 12 arranges the description-data segments in the order of priority.

At a step S5-5, the data processing and transferring unit 12 sends the description-data segments one by one to the client 20 in the order of priority.

At a step S5-6, the data processing and transferring unit 12 checks whether the transfer of the virtual-world-description data is finished. If the data transfer is finished, the procedure goes to a step S5-7. Otherwise, the procedure goes back to the step S5-5.

At the step S5-7, the data processing and transferring unit 12 sends a notice of transfer completion to the client 20. This ends the procedure with regard to the data processing and transferring unit 12.

By carrying out the process shown in the above-described flowchart, the virtual-world-description-data transfer system of the fifth embodiment divides the virtual-world-description data into the description-data segments, and sends and displays the description-data segments one after another in a decreasing order of the levels of importance. At the same time, the virtual-world-description-data transfer system allows the user to manipulate (or operate) an object which has been already displayed. In this manner, important objects are displayed ahead of other objects.

A sixth embodiment of the virtual-world-description-data transfer system of the present invention prioritizes each object according to energy of each object. In the sixth embodiment, the virtual-world-description-data transfer system having the same configuration as that of FIG. 10 will be used.

The sixth embodiment will be described below with reference to FIG. 10. The data processing and transferring unit 12 divides the virtual-world-description data into a plurality of description-data segments. The data processing and transferring unit 12 further obtains energy of each description-data segment based on map information created in advance and predetermined parameters provided for each description-data segment. The data processing and transferring unit 12 gives a priority level to each of the description-data segments in an increasing order of the energy. According to this priority level, the data processing and transferring unit 12 sends the description-data segments one after another. The operation of the client 20 is the same as that in the case of FIG. 1, and a description thereof will be omitted.

The parameters used in the energy calculation are defined in advance with regard to the virtual-world-description data prior to the division. These parameters are decided by a designer when he/she creates the virtual-world-description data. An example of the parameters is popularity of each object (e.g., expected frequency of references of each object). The map information specifies how easy it is to go through a path (e.g., a road) to reach a destination, which depends on a width of the road, possible obstacles in the way, etc. When energy of a given object is calculated, popularity of the object, a distance from the object, a degree as to how easy it is to go through a path to the object, etc. are combined to provide a function for measuring the energy. The more popular the object is, the further distanced the object is, the easier the path to the object is, the smaller the energy. Details of how to define the energy is a matter of design choice, and a description thereof will be omitted.

With reference again to FIG. 9, assume that the first house 65 is attractive but a path to the first house 65 is not easy to go through, and that the church 67 is far from the current position, but is attractive and a path (the road 63) to the church 67 is easy to take. Based on a combination of these factors, the church 67 is provided with the lowest energy, and the first house 65 is given the second lowest energy, for example. When objects are transferred and displayed in the order of priority, the church 67 is displayed first, and, then, the first house 65 is displayed before following objects. Even if all the objects are not yet displayed, the user can manipulate (or operate) an object such as the church 67 which has been already displayed.

Figure 18:
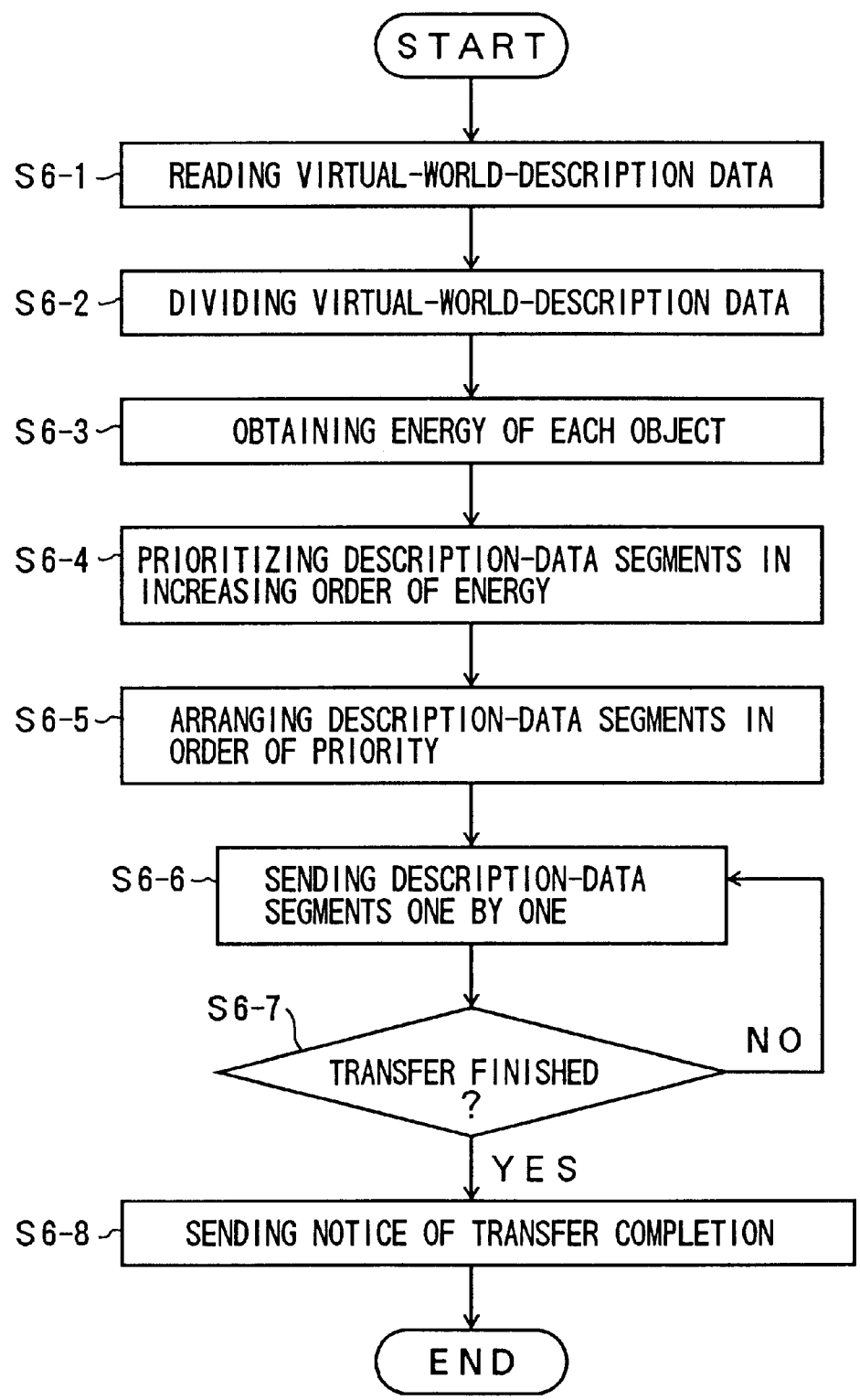
FIG. 18 is a flowchart of a process carried out by the data processing and transferring unit of the server in the sixth embodiment.

FIG. 18 is a flowchart of a process carried out by the data processing and transferring unit 12 of the server 10A in the sixth embodiment.

In FIG. 18, at a step S6-1, the data processing and transferring unit 12 reads virtual-world-description data from the virtual-world-description-data storage unit 11.

At a step S6-2, the data processing and transferring unit 12 divides the virtual-world-description data into a plurality of description-data segments.

At a step S6-3, the data processing and transferring unit 12 obtains energy of each object of the description-data segments based on the predetermined parameters and the map information.

At a step S6-4, the data processing and transferring unit 12 prioritizes the description-data segments in an increasing order of the energy.

At a step S6-5, the data processing and transferring unit 12 arranges the description-data segments in the order of priority.

At a step S6-6, the data processing and transferring unit 12 sends the description-data segments one by one to the client 20 in the order of priority.

At a step S6-7, the data processing and transferring unit 12 checks whether the transfer of the virtual-world-description data is finished. If the data transfer is finished, the procedure goes to a step S6-8. Otherwise, the procedure goes back to the step S6-6.

At the step S6-8, the data processing and transferring unit 12 sends a notice of transfer completion to the client 20. This ends the procedure with regard to the data processing and transferring unit 12.

By carrying out the process shown in the above-described flowchart, the virtual-world-description-data transfer system of the sixth embodiment divides the virtual-world-description data into the description-data segments, and sends and displays the description-data segments one after another in an increasing order of energy of the objects. At the same time, the virtual-world-description-data transfer system allows the user to manipulate (or operate) an object which has been already displayed. In this manner, attractive objects which are easy to approach are displayed ahead of other objects, and can accept user manipulation.

In what follows, embodiments for enhancing user interactions and reducing the amount of data transfer will be described, wherein these embodiments are used when the description-data segments are transferred in a given order of priority.

A seventh embodiment of the virtual-world-description-data transfer system of the present invention dynamically prioritizes each object so as to enhance interactions with a user during the data transfer. In the seventh embodiment, the virtual-world-description-data transfer system having the same configuration as that of FIG. 10 will be used.

The seventh embodiment will be described below with reference to FIG. 10.

The data processing and transferring unit 12 divides the virtual-world-description data into a plurality of description-data segments, and prioritizes each of the description-data segments. Here, the priority may be decided based on the distance from the viewpoint, the number of references, the object altitude, or the like, and an order of priority described in connection with any one of the previous embodiments can be used as long as the order of priority can be modified by the user manipulation. According to this priority order, the data processing and transferring unit 12 sends the description-data segments one after another.

The operation-information receiving unit 13 of the server 10A receives operation information from the data displaying and processing unit 22 of the client 20 when the operation information is input by a user to the operation unit 23 of the client 20. Here, the operation information specifies a shift of the viewpoint, selection of an object, etc. The operation-information receiving unit 13 supplies this information to the data processing and transferring unit 12. Upon receiving the operation information from the operation-information receiving unit 13, the data processing and transferring unit 12 determines a new priority order based on the operation information. Description-data segments which have been already transferred are excluded from the calculation of the new priority order, and only the remaining description-data segments are taken into consideration. Based on this new priority order, the data processing and transferring unit 12 transfers the description-data segments one after another. Operations of the client 20 are the same as those of FIG. 1, and a description thereof will be omitted.

With reference to FIG. 9 again, when priority is given according to a distance from the viewpoint, for example, the position of the initial view 60 entails each object being transferred and displayed in an order of the road 63, the weeds 61, the first tree 62, the second tree 64, and so on. Assume that a user enters a viewpoint-shift operation to the operation unit 23 when the weeds 61 has been already displayed but the following objects are not yet shown on the screen. When this happens, priority is recalculated with regard to the objects which have not been transferred, based on a new viewpoint defined by the operation information. If the viewpoint is shifted to near the church 67, for example, the church 67 is given the highest priority among the remaining objects to be transferred. After the recalculation, each object is transferred and displayed according to the new priority order. Namely, after the weeds 61 are displayed, the data of the church 67 is transferred so that the road 63, the weeds 61, and the church 67 are shown in the virtual world viewed from the new viewpoint, and following objects are subsequently displayed.

Figure 19:
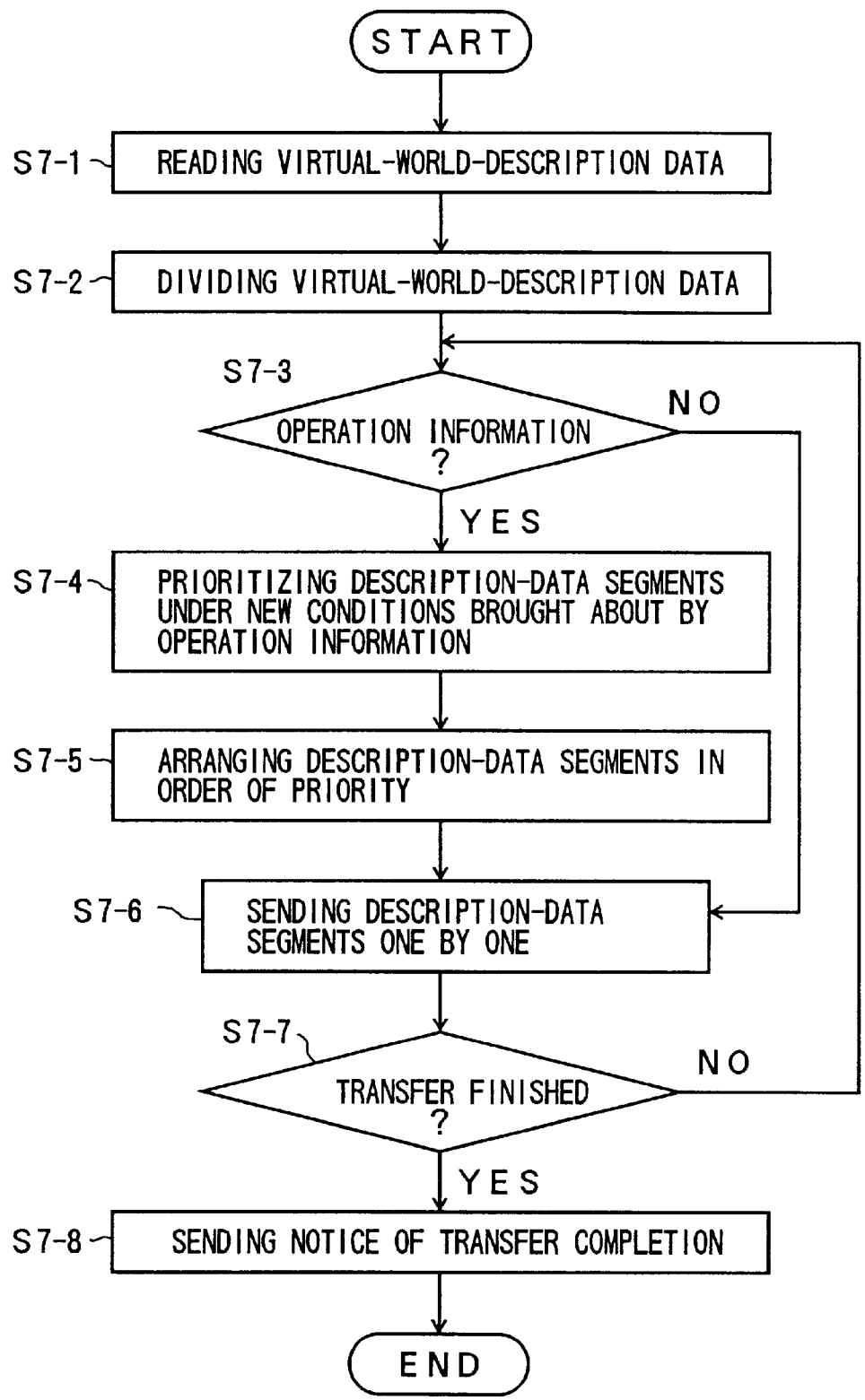
FIG. 19 is a flowchart of a process carried out by the data processing and transferring unit of the server in the seventh embodiment.

FIG. 19 is a flowchart of a process carried out by the data processing and transferring unit 12 of the server 10A in the seventh embodiment.

In FIG. 19, at a step S7-1, the data processing and transferring unit 12 reads virtual-world-description data from the virtual-world-description-data storage unit 11.

At a step S7-2, the data processing and transferring unit 12 divides the virtual-world-description data into a plurality of description-data segments.

At a step S7-3, the data processing and transferring unit 12 checks whether operation information is provided. If it is, the procedure goes to a step S7-4. Otherwise, the procedure goes to a step S7-6. In an initial state, the operation information is about the initial viewpoint.

At a step S7-4, the data processing and transferring unit 12 prioritizes the description-data segments which have not been transferred, under new conditions brought about by the operation information.

At a step S7-5, the data processing and transferring unit 12 arranges the description-data segments in the order of priority.

At a step S7-6, the data processing and transferring unit 12 sends the description-data segments one by one to the client 20 in the order of priority.

At a step S7-7, the data processing and transferring unit 12 checks whether the-transfer of the virtual-world-description data is finished. If the data transfer is finished, the procedure goes to a step S7-8. Otherwise, the procedure goes back to the step S7-6.

At the step S7-8, the data processing and transferring unit 12 sends a notice of transfer completion to the client 20. This ends the procedure with regard to the data processing and transferring unit 12.

By carrying out the process shown in the above-described flowchart, the virtual-world-description-data transfer system of the seventh embodiment divides the virtual-world-description data into the description-data segments, and sends and displays the description-data segments one after another in an order of priority. If user operations are entered, a priority order of the description-data segments waiting for data transfer are recalculated, and these description-data segments are transferred according to the new priority order. In this manner, even when conditions such as a position of the viewpoint are changed, data segments which are high in priority after changes in conditions are transferred and displayed ahead of other objects, thereby allowing the user to manipulate these priority objects.

An eighth embodiment of the virtual-world-description-data transfer system of the present invention reduces the amount of data transfer by putting together low-priority description-data segments and sending them as two dimensional data. In the eighth embodiment, the virtual-world-description-data transfer system having the same configuration as that of FIG. 10 will be used.

The eighth embodiment will be described below with reference to FIG. 10. The data processing and transferring unit 12 divides the virtual-world-description data into a plurality of description-data segments, and prioritizes each of the description-data segments. Further, the data processing and transferring unit 12 selects description-data segments which are lower in priority than a predetermined priority level, and transforms these data segments into 2-dimensional information by putting them together. According to the priority order, the data processing and transferring unit 12 sends the description-data segments one after another, and transfers the 2-dimensional information at the end. Operations of the client 20 are the same as those of FIG. 1, and a description thereof will be omitted.

Figure 21:
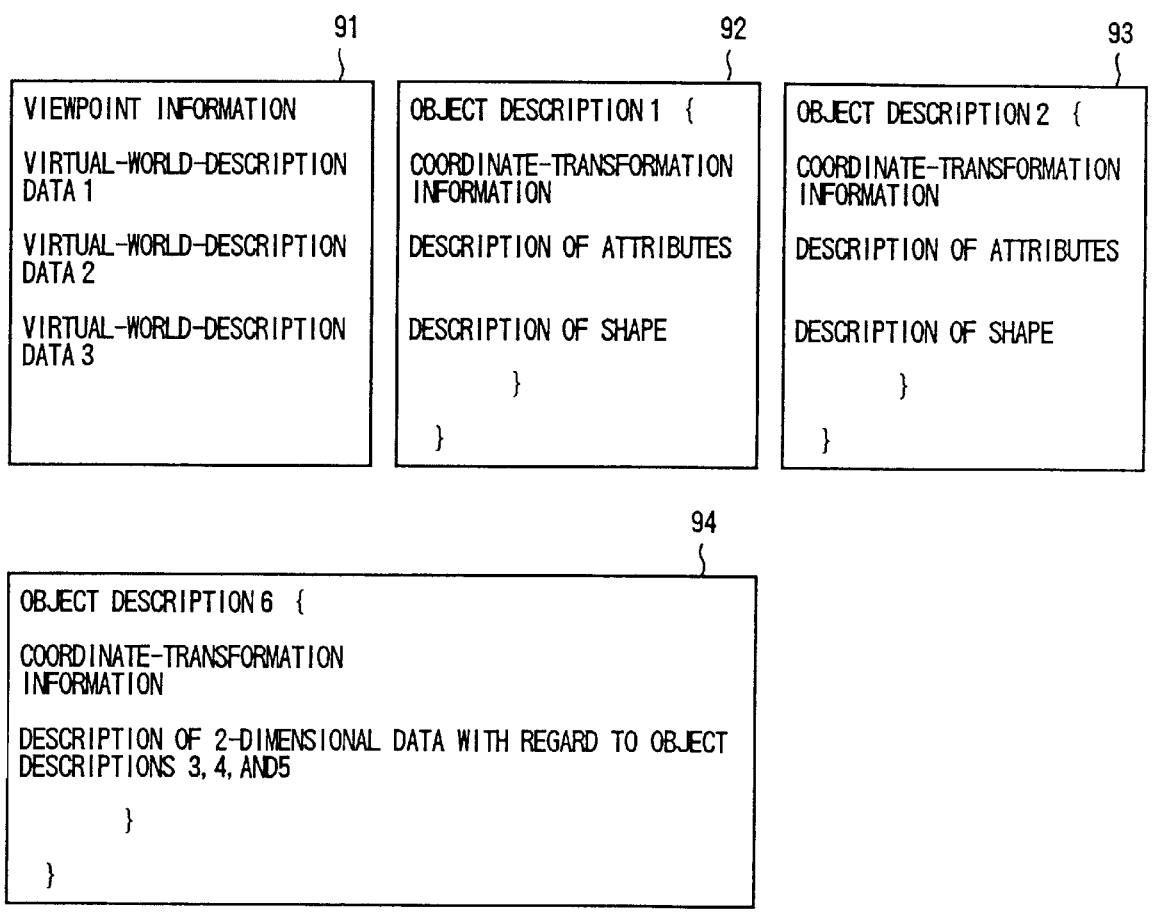
FIG. 21 is an illustrative drawing showing an example of the virtual-world-description data divided into description-data segments wherein some of the description-data segments having lower priority are put together as 2-dimensional data.

FIG. 20 is an illustrative drawing showing an example of the virtual-world-description data. FIG. 21 is an illustrative drawing showing an example of the virtual-world-description data divided into description-data segments wherein some of the description-data segments having lower priority are put together as 2-dimensional data.

In the example of FIG. 20, the virtual world is comprised of five objects. Virtual-world-description data 90 includes viewpoint information indicating a position of the viewpoint, an object description 1 describing a first object, an object description 2 describing a second object, an object description 3 describing a third object, an object description 4 describing a fourth object, and an object description 5 describing a fifth object. The third through fifth objects are transformed into 2-dimensional data because they have lower priority.

As shown in FIG. 21, the divided virtual-world-description data includes description-data segments 91 through 94. The description-data segment 91 includes viewpoint information and other data which indicates that the description-data segments 92 through 94 are included as the virtual-world-description data. The description-data segments 92 and 93 include the object descriptions 1 and 2 of FIG. 20, respectively, each of which includes coordinate-transformation information, a description of attributes, and a description of shape with respect to a respective object. The description-data segment 94 is a 2-dimensional representation putting together the object descriptions 3 through 5, and includes coordinate-transformation information, a description of 2-dimensional data, and a description of the shape.

With reference to FIG. 9 again, when priority is given according to a distance from the viewpoint, for example, the position of the initial view 60 entails each object being prioritized in an order of the road 63, the weeds 61, the first tree 62, the second tree 64, and so on. Objects which is at a distance farther than a predetermined distance such as the cloud 69, the mountain 70, and the moon 71 are transformed into 2-dimensional data. That is, appearance of the cloud 69, the mountain 70, and the moon 71 viewed from the viewpoint is obtained by display calculation, and 2-dimensional data representing the appearance in a picture-like manner is obtained. This 2-dimensional data is put together to be buried into the background. Each object is transferred and displayed in an order of priority, and the 2-dimensional data of the background including the cloud 69, the mountain 70, and the moon 71 will be transferred and displayed at the end. Namely, the cloud 69, the mountain 70, and the moon 71 will be displayed at once after other objects are shown on the screen one after another. Objects represented by 2-dimensional data have disadvantages such as lack of solidness in appearance and absence of shape changes at the time of viewpoint shift. Such disadvantages are not significant when objects such as cloud 69, the mountain 70, the moon 71, etc., are represented by 2-dimensional data.

Figure 22:
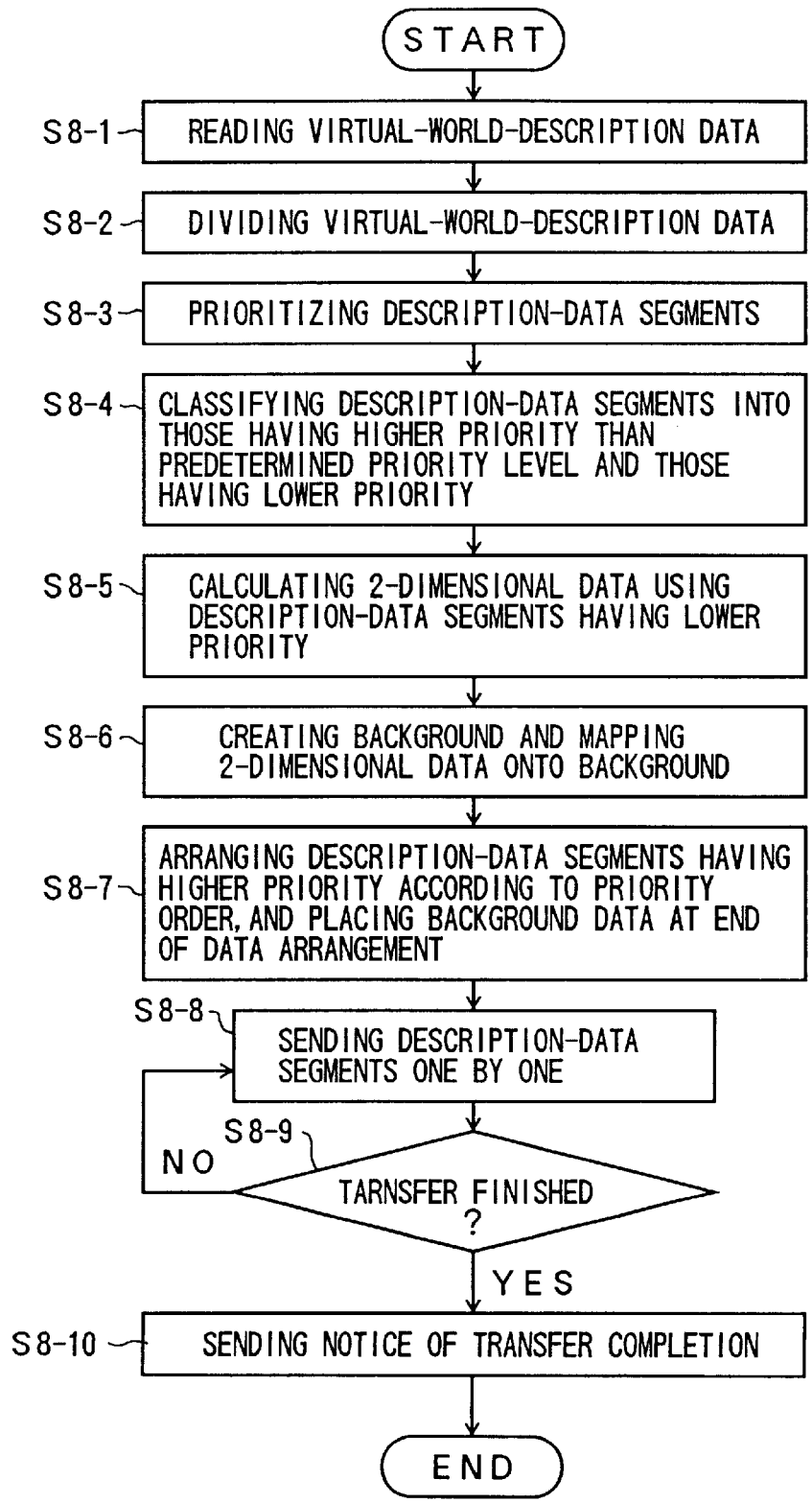
FIG. 22 is a flowchart of a process carried out by the data processing and transferring unit of the server in the eighth embodiment.

FIG. 22 is a flowchart of a process carried out by the data processing and transferring unit 12 of the server 10A in the eighth embodiment.

In FIG. 22, at a step S8-1, the data processing and transferring unit 12 reads virtual-world-description data from the virtual-world-description-data storage unit 11.

At a step S8-2, the data processing and transferring unit 12 divides the virtual-world-description data into a plurality of description-data segments.

At a step S8-3, the data processing and transferring unit 12 prioritizes the description-data segments.

At a step S8-4, the data processing and transferring unit 12 classifies the description-data segments into those having higher priority than a predetermined priority level and those having lower priority.

At a step S8-5, the data processing and transferring unit 12 calculates the appearance on a screen of the description-data segments having lower priority so as to generate 2-dimensional data.

At a step S8-6, the data processing and transferring unit 12 creates a background, and maps the 2-dimensional data onto the background. In the example of FIG. 9, the cloud 69, the mountain 70, and the moon 71 are mapped onto the background.

At a step S8-7, the data processing and transferring unit 12 arranges the description-data segments having higher priority according to the priority order, and place the background data at the end of the data arrangement.

At a step S8-8, the data processing and transferring unit 12 sends the description-data segments one by one to the client 20 in an order of the data arrangement.

At a step S8-9, the data processing and transferring unit 12 checks whether the transfer of the virtual-world-description data is finished. If the data transfer is finished, the procedure goes to a step S8-10. Otherwise, the procedure goes back to the step S8-8.

At the step S8-10, the data processing and transferring unit 12 sends a notice of transfer completion to the client 20. This ends the procedure with regard to the data processing and transferring unit 12.

By carrying out the process shown in the above-described flowchart, the virtual-world-description-data transfer system of the eighth embodiment divides the virtual-world-description data into the description-data segments, and sends and displays the description-data segments one after another in an order of priority, while objects having lower priority than a predetermined priority level are put together as 2-dimensional data before data transfer thereof. In this manner, the amount of data transfer is reduced, so that objects having lower priority can be displayed earlier than otherwise.

A ninth embodiment of the virtual-world-description-data transfer system of the present invention reduces the amount of data transfer by transferring low-priority description-data segments as simplified polygon data. In the ninth embodiment, the virtual-world-description-data transfer system having the same configuration as that of FIG. 10 will be used.

The ninth embodiment will be described below with reference to FIG. 10. The data processing and transferring unit 12 divides the virtual-world-description data into a plurality of description-data segments, and prioritizes each of the description-data segments. According to the priority order, the data processing and transferring unit 12 sends the description-data segments one after another. When transferring description-data segments which are lower in priority than a predetermined priority level, the data processing and transferring unit 12 selects simplified polygon data provided in advance for data transfer. Operations of the client 20 are the same as those of FIG. 1, and a description thereof will be omitted.

Figure 23:
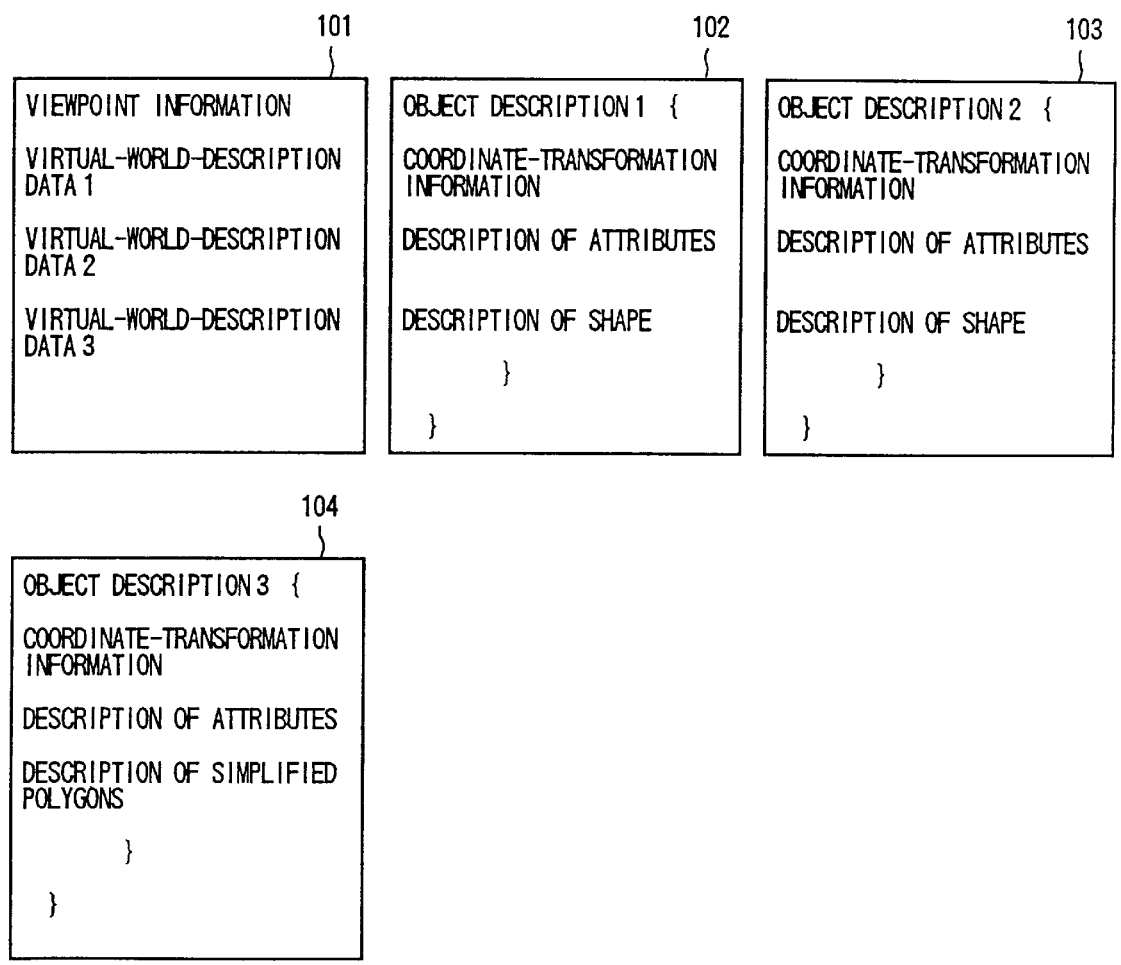
FIG. 23 is an illustrative drawing showing an example of the virtual-world-description data which is divided and transferred according to the ninth embodiment.

FIG. 23 is an illustrative drawing showing an example of the virtual-world-description data which is divided and transferred according to the ninth embodiment.

As shown in FIG. 23, the divided virtual-world-description data includes description-data segments 101 through 104. The description-data segment 101 includes viewpoint information and other data which indicates that the description-data segments 102 through 104 are included as the virtual-world-description data. The description-data segments 102 and 103 include the object descriptions 1 and 2, respectively, each of which includes coordinate-transformation information, a description of attributes, and a description of shape with respect to a respective object. The description-data segment 104 includes coordinate-transformation information, a description of attribute data, and a description of simplified polygons.

What is shown in FIG. 23 is the description-data segments for data transfer, so that the description-data segments 102 and 103 only include full polygon data, and the description-data segment 104 includes only the simplified polygon data. Prior to the data transfer, however, each of the description-data segments may preferably include both the full polygon data and the simplified polygon data.

With reference to FIG. 9 again, when priority is given according to a distance from the viewpoint, for example, the position of the initial view 60 entails each object being prioritized in an order of the road 63, the weeds 61, the first tree 62, the second tree 64, and so on. In this order of priority, each object is transferred and displayed one by one. During the transfer, however, objects which are at a distance farther than a predetermined distance, e.g., the mountain 70 and the moon 71, are transferred as simplified polygon data instead of full polygon data. Namely, full polygon data for representing a detailed shape of the mountain 70, for example, is not used for data transfer. Rather, simplified polygon data is transferred to represent a brief shape of the mountain 70 by using a smaller number of polygons.

Figure 24:
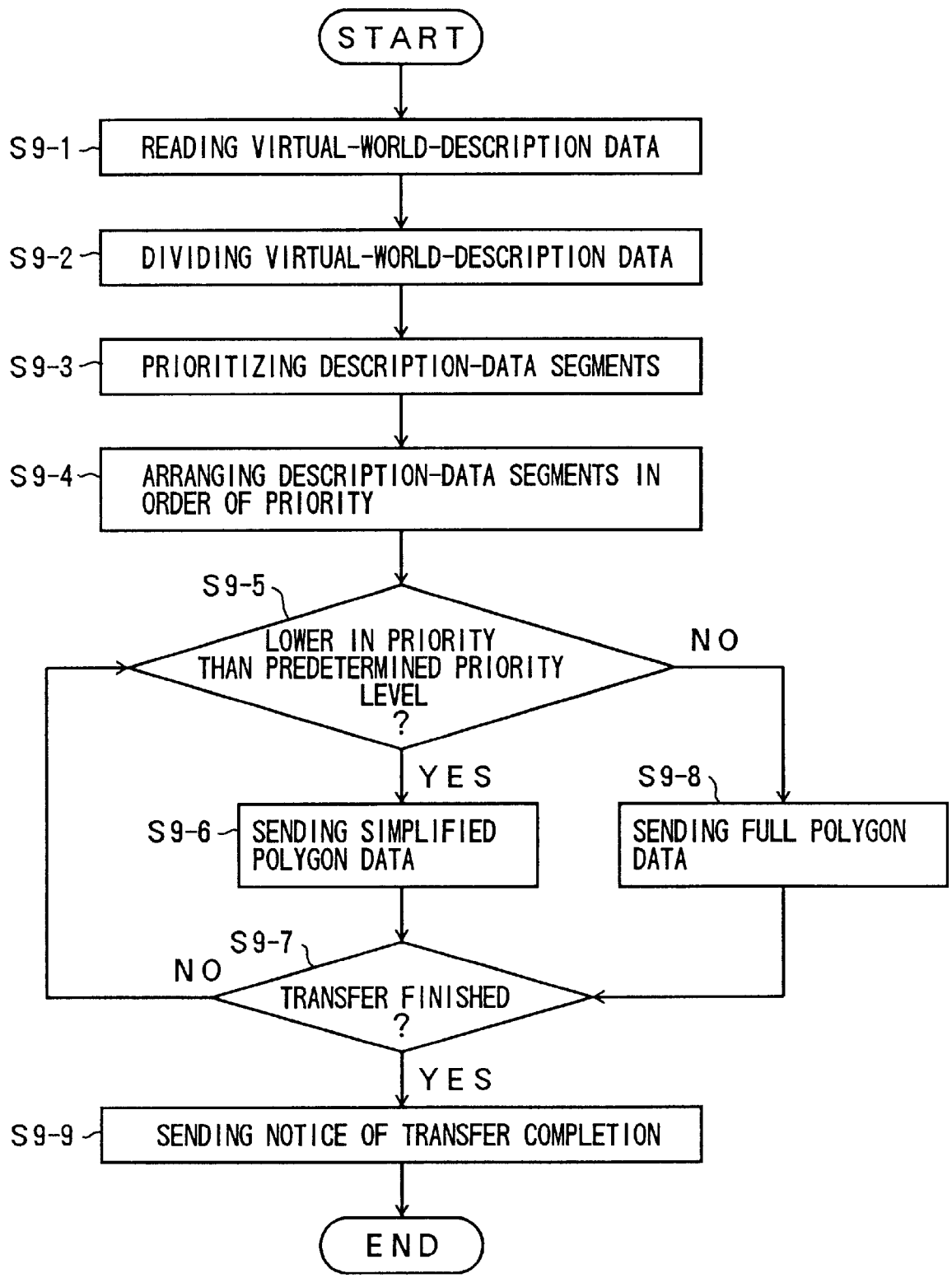
FIG. 24 is a flowchart of a process carried out by the data processing and transferring unit of the server in the ninth embodiment.

FIG. 24 is a flowchart of a process carried out by the data processing and transferring unit 12 of the server 10A in the ninth embodiment.

In FIG. 22, at a step S9-1, the data processing and transferring unit 12 reads virtual-world-description data from the virtual-world-description-data storage unit 11.

At a step S9-2, the data processing and transferring unit 12 divides the virtual-world-description data into a plurality of description-data segments.

At a step S9-3, the data processing and transferring unit 12 prioritizes the description-data segments.

At a step S9-4, the data processing and transferring unit 12 arranges the description-data segments in an order of priority.

At a step S9-5, the data processing and transferring unit 12 checks whether a given description-data segment provided for data transfer is lower in priority than a predetermined priority level. If it is, the procedure goes to a step S9-6. Otherwise, the procedure goes to a step S9-8.

At the step S9-6, the data processing and transferring unit 12 sends the given description-data segment which only includes simplified polygon data.

At the step S9-8, the data processing and transferring unit 12 sends the given description-data segment which only includes full polygon data.

At a step S9-7, the data processing and transferring unit 12 checks whether the transfer of the virtual-world-description data is finished. If the data transfer is finished, the procedure goes to a step S9-9. Otherwise, the procedure goes back to the step S9-5.

At the step S9-9, the data processing and transferring unit 12 sends a notice of transfer completion to the client 20. This ends the procedure with regard to the data processing and transferring unit 12.

By carrying out the process shown in the above-described flowchart, the virtual-world-description-data transfer system of the ninth embodiment divides the virtual-world-description data into the description-data segments, and sends and displays the description-data segments one after another in an order of priority, while objects having lower priority than a predetermined priority level are transferred as simplified polygon data. In this manner, the amount of data transfer is reduced, so that objects having lower priority can be displayed earlier than otherwise.

A tenth embodiment of the virtual-world-description-data transfer system of the present invention reduces the amount of data transfer by transferring low-priority description-data segments as flat-surface data. In the tenth embodiment, the virtual-world-description-data transfer system having the same configuration as that of FIG. 10 will be used.

The tenth embodiment will be described below with reference to FIG. 10. The data processing and transferring unit 12 divides the virtual-world-description data into a plurality of description-data segments, and prioritizes each of the description-data segments. According to the priority order, the data processing and transferring unit 12 sends the description-data segments one after another. When transferring description-data segments which are lower in priority than a predetermined priority level, the data processing and transferring unit 12 calculates flat-surface data for data transfer. Operations of the client 20 are the same as those of FIG. 1, and a description thereof will be omitted.

With reference to FIG. 9 again, when priority is given according to a distance from the viewpoint, for example, the position of the initial view 60 entails each object being prioritized in an order of the road 63, the weeds 61, the first tree 62, the second tree 64, and so on. In this order of priority, each object is transferred and displayed one by one. During the transfer, however, objects which are at a distance farther than a predetermined distance, e.g., the mountain 70 and the moon 71, are projected onto a flat-surface to obtain flat-surface data, and this flat-surface data is transferred. Namely, the 3-dimensional shape of the mountain 70, for example, is projected onto a plane to create flat-surface data representing a 2-dimensional shape of the mountain 70, and this flat-surface data is transferred. In this embodiment, the flat-surface data of the mountain 70 and the flat-surface data of the moon 71 are different object data, and are transferred as separate data. Since these objects retain information on 3-dimensional positions, relative positions of the mountain 70 and the moon 71 change as the viewpoint shifts. It should be noted, however, that the appearance of mountain 70 and the moon 71 is not changed by the movement of the viewpoint since these objects are represented as flat objects. Compared to the eighth embodiment in which objects are put together and integrated into the background, the tenth embodiment can represent the virtual world in a more appropriate manner.

Figure 25:
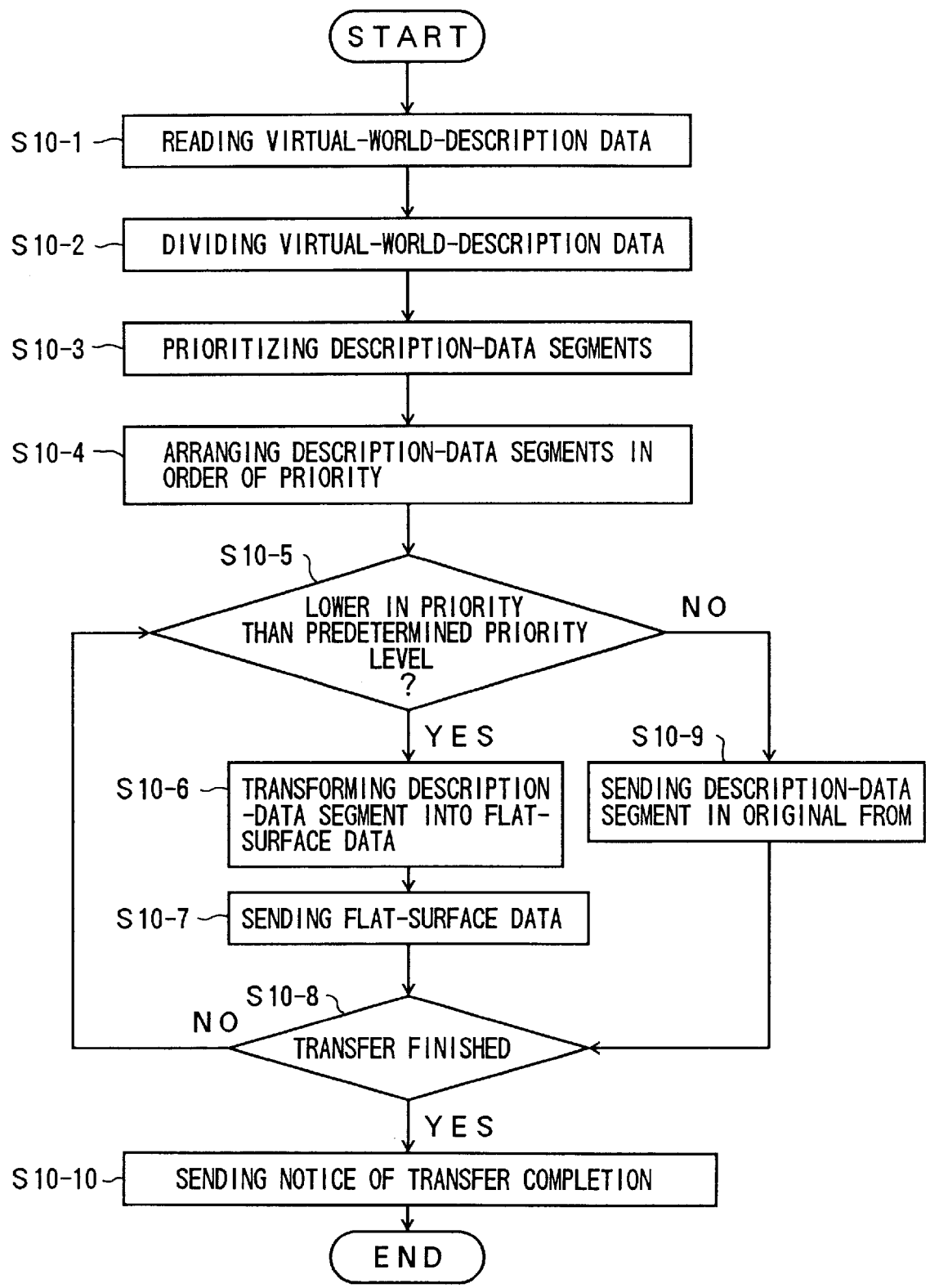
FIG. 25 is a flowchart of a process carried out by the data processing and transferring unit of the server in the tenth embodiment.

FIG. 25 is a flowchart of a process carried out by the data processing and transferring unit 12 of the server 10A in the tenth embodiment.

In FIG. 25, at a step S10-1, the data processing and transferring unit 12 reads virtual-world-description data from the virtual-world-description-data storage unit 11.

At a step S10-2, the data processing and transferring unit 12 divides the virtual-world-description data into a plurality of description-data segments.

At a step S10-3, the data processing and transferring unit 12 prioritizes the description-data segments.

At a step S10-4, the data processing and transferring unit 12 arranges the description-data segments in an order of priority.

At a step S10-5, the data processing and transferring unit 12 checks whether a given description-data segment provided for data transfer is lower in priority than a predetermined priority level. If it is, the procedure goes to a step S10-6. Otherwise, the procedure goes to a step S10-9.

At the step S10-6, the data processing and transferring unit 12 transforms the given description-data segment into flat-surface data by projecting the shape thereof onto a plane.

At a step S10-7, the data processing and transferring unit 12 transfers the given description-data segment after replacing the shape data of this data segment with the flat-surface data.

At the step S10-9, the data processing and transferring unit 12 sends the given description-data segment as it was originally obtained at the time of data division.

At a step S10-8, the data processing and transferring unit 12 checks whether the transfer of the virtual-world-description data is finished. If the data transfer is finished, the procedure goes to a step S10-10. Otherwise, the procedure goes back to the step S10-5.

At the step S10-10, the data processing and transferring unit 12 sends a notice of transfer completion to the client 20. This ends the procedure with regard to the data processing and transferring unit 12.

By carrying out the process shown in the above-described flowchart, the virtual-world-description-data transfer system of the tenth embodiment divides the virtual-world-description data into the description-data segments, and sends and displays the description-data segments one after another in an order of priority, while objects having lower priority than a predetermined priority level are transferred as flat-surface data. In this manner, the amount of data transfer is reduced, so that objects having lower priority can be displayed earlier than otherwise.

An eleventh embodiment of the virtual-world-description-data transfer system of the present invention reduces the amount of data transfer by transferring names of objects when the objects are low-priority description-data segments.

Figure 26:
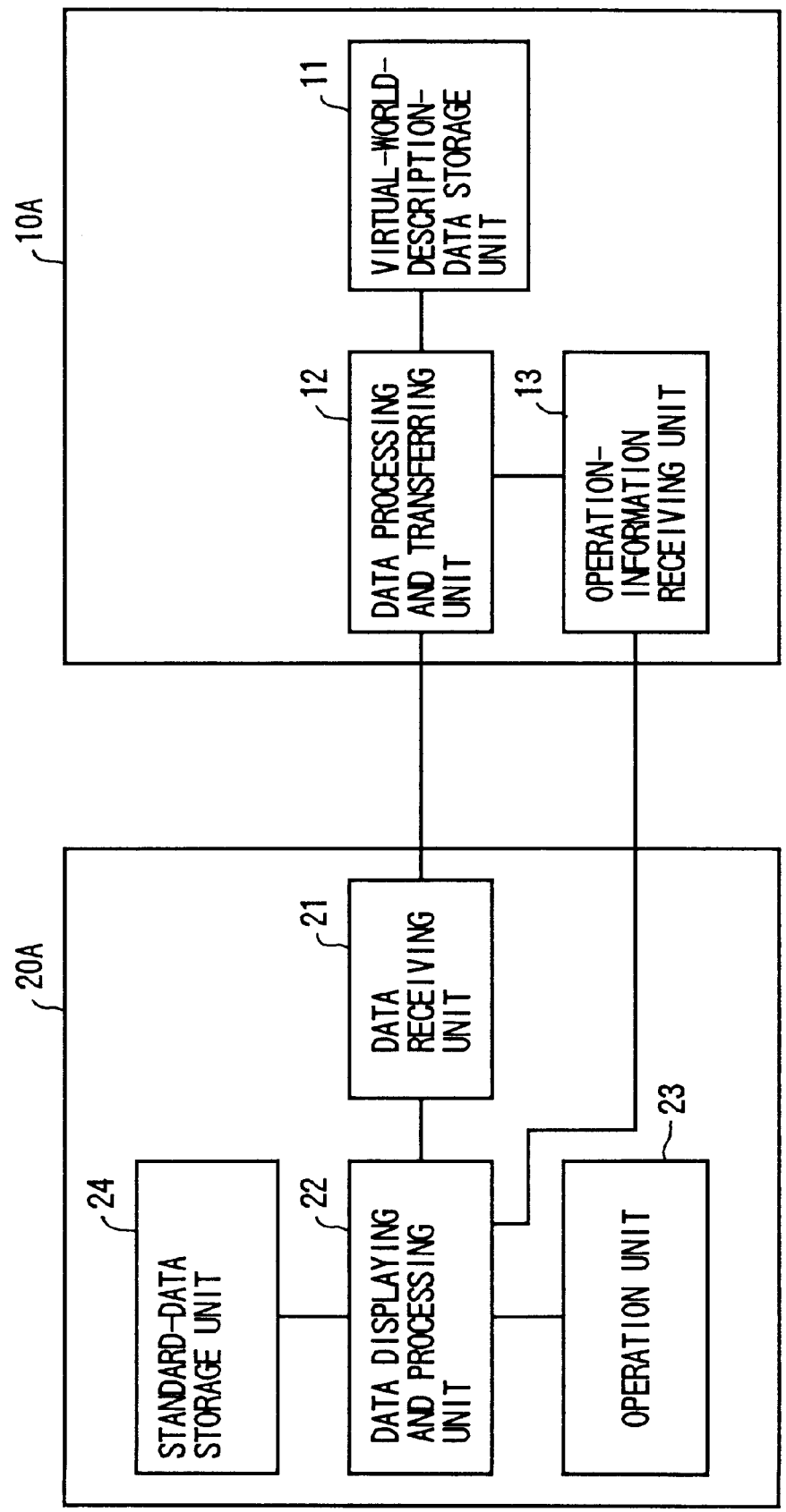
FIG. 26 is a block diagram of the eleventh embodiment of the virtual-world-description-data transfer system according to the present invention.

FIG. 26 is a block diagram of the eleventh embodiment of the virtual-world-description-data transfer system according to the present invention. In FIG. 26, the same elements as those of FIG. 10 are referred to by the same numerals, and a description thereof will be omitted.

The virtual-world-description-data transfer system of FIG. 26 includes the server 10A and a client 20A. The server 10A includes the virtual-world-description-data storage unit 11, the data processing and transferring unit 12, and the operation-information receiving unit 13. The client 20A includes the data receiving unit 21, the data displaying and processing unit 22, the operation unit 23, and a standard-data storage unit 24.

The data processing and transferring unit 12 of the server 10A divides the virtual-world-description data into a plurality of description-data segments, and prioritizes each of the description-data segments. According to the priority order, the data processing and transferring unit 12 sends the description-data segments one after another. When transferring description-data segments which are lower in priority than a predetermined priority level, the data processing and transferring unit 12 transfers names of objects instead of description-data segments themselves.

The data receiving unit 21 of the client 20A receives data one by one from the server 10A, and transfers the received data one after another to the data displaying and processing unit 22. When the received data is a name, the data displaying and processing unit 22 searches the standard-data storage unit 24 to find corresponding data identified by that name. The data displaying and processing unit 22 then displays an object corresponding to the transferred description-data segment by using attribute and shape descriptions contained in the searched data.

Figure 27:
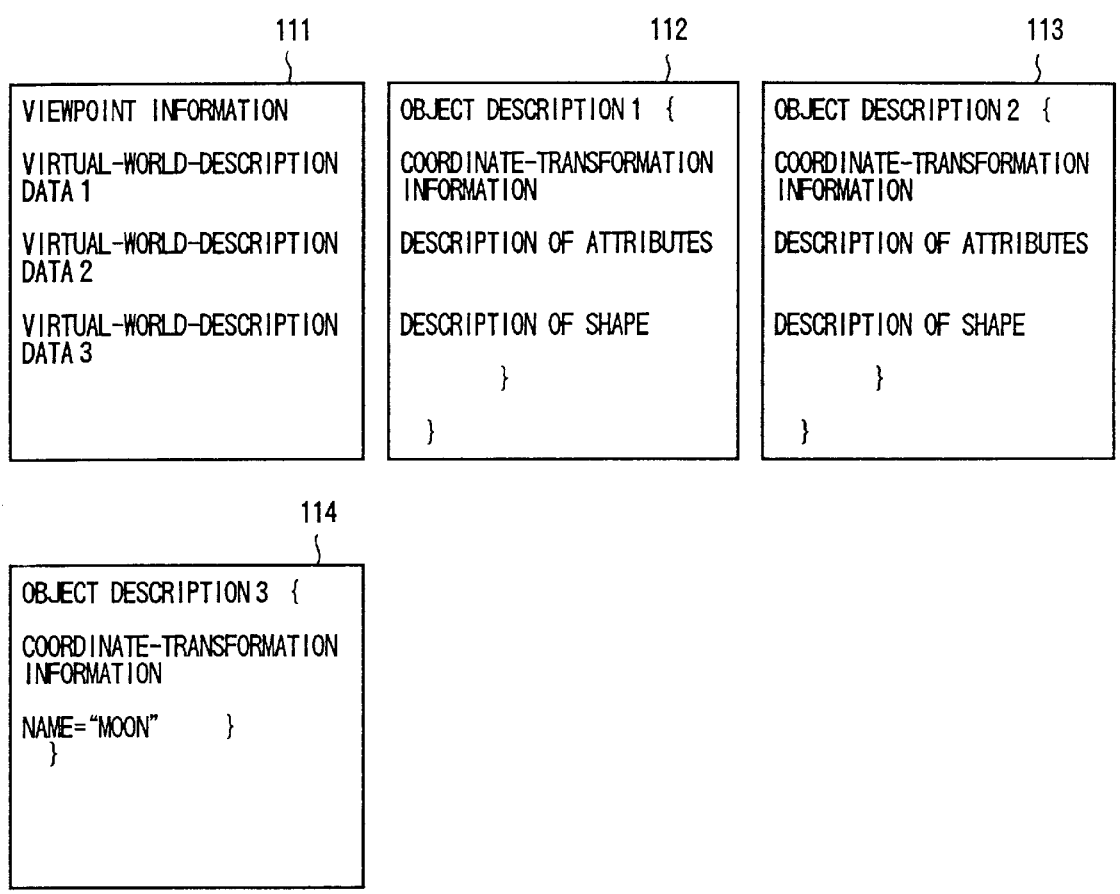
FIG. 27 is an illustrative drawing showing an example of the virtual-world-description data which is divided and transferred according to the eleventh embodiment.

FIG. 27 is an illustrative drawing showing an example of the virtual-world-description data which is divided and transferred according to the eleventh embodiment.

As shown in FIG. 27, the divided virtual-world-description data includes description-data segments 111 through 114. The description-data segment 111 includes viewpoint information and other data which indicates that the description-data segments 112 through 114 are included as the virtual-world-description data. The description-data segments 112 and 113 include the object descriptions 1 and 2, respectively, each of which includes coordinate-transformation information, a description of attributes, and a description of shape with respect to a respective object. The description-data segment 114 includes coordinate-transformation information and name data. In this example, an object of the description-data segment 114 is the moon, so that the name "moon" is included as name data.

With reference to FIG. 9 again, when priority is given according to a distance from the viewpoint, for example, the position of the initial view 60 entails each object being prioritized in an order of the road 63, the weeds 61, the first tree 62, the second tree 64, and so on. In this order of priority, each object is transferred and displayed one by one. During the transfer, however, objects which are at a distance farther than a predetermined distance, e.g., the moon 71, are transferred after replacing the contents of the description-data segments with the names of the objects. On the receiver side, data corresponding to the name "moon", for example, is searched for in the database, and the moon 71 is displayed by using the attributes and shape of the searched data. Because of this process, if the shape of the moon registered in the database is a full moon, the moon 71 will be displayed as a full moon even through the moon 71 of FIG. 9 is a crescent moon.

Figure 28:
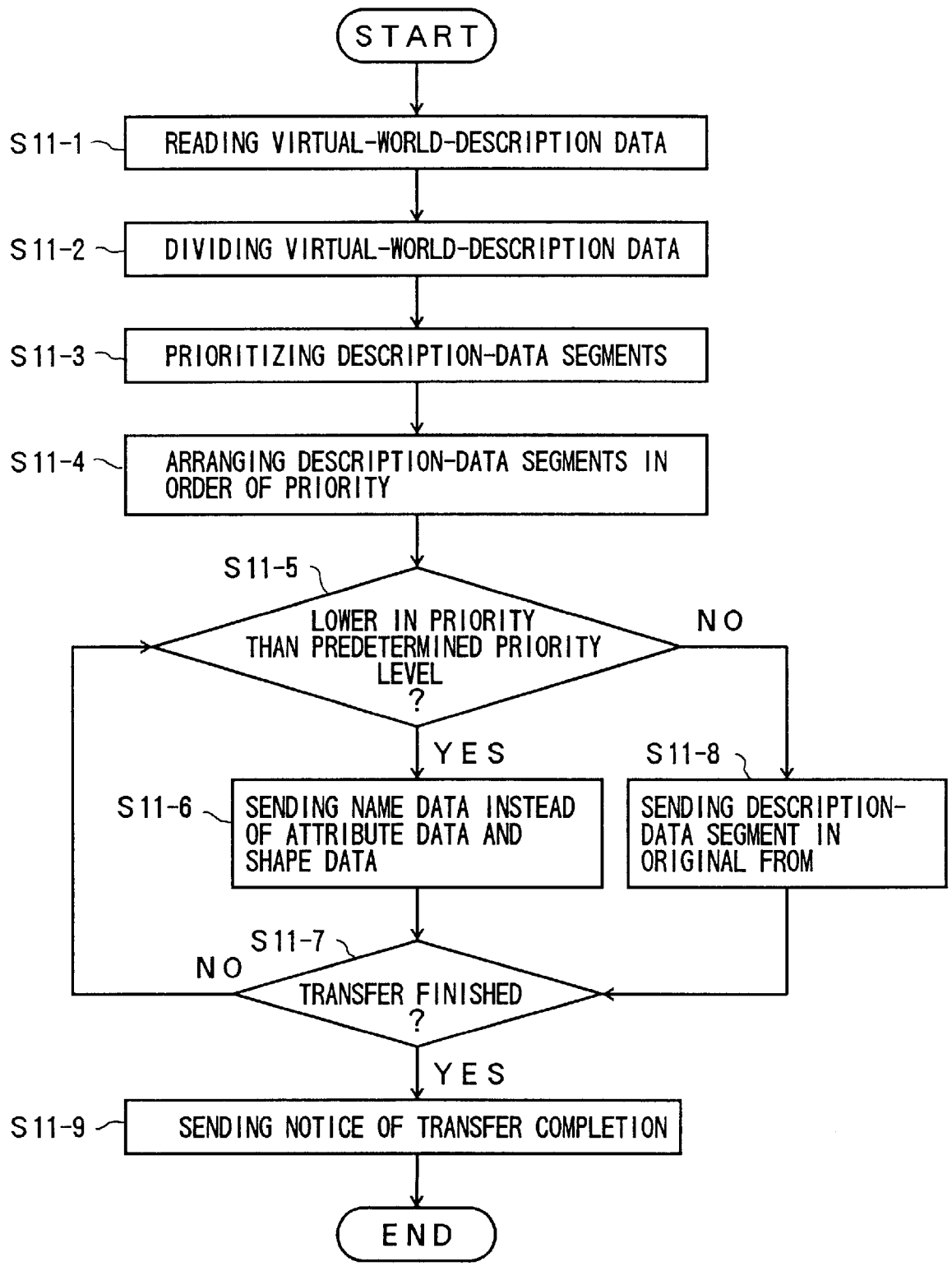
FIG. 28 is a flowchart of a process carried out by the data processing and transferring unit of the server in the eleventh embodiment.

FIG. 28 is a flowchart of a process carried out by the data processing and transferring unit 12 of the server 10A in the eleventh embodiment.

In FIG. 28, at a step S11-1, the data processing and transferring unit 12 reads virtual-world-description data from the virtual-world-description-data storage unit 11.

At a step S11-2, the data processing and transferring unit 12 divides the virtual-world-description data into a plurality of description-data segments.

At a step S11-3, the data processing and transferring unit 12 prioritizes the description-data segments.

At a step S11-4, the data processing and transferring unit 12 arranges the description-data segments in an order of priority.

At a step S11-5, the data processing and transferring unit 12 checks whether a given description-data segment provided for data transfer is lower in priority than a predetermined priority level. If it is, the procedure goes to a step S11-6. Otherwise, the procedure goes to a step S11-8.

At a step S11-6, the data processing and transferring unit 12 transfers the given description-data segment after replacing the attribute data and shape data of this data segment with a name data provided in advance.

At the step S11-8, the data processing and transferring unit 12 sends the given description-data segment as it was originally obtained at the time of data division.

At a step S11-7, the data processing and transferring unit 12 checks whether the transfer of the virtual-world-description data is finished. If the data transfer is finished, the procedure goes to a step S11-9. Otherwise, the procedure goes back to the step S11-5.

At the step S11-9, the data processing and transferring unit 12 sends a notice of transfer completion to the client 20. This ends the procedure with regard to the data processing and transferring unit 12.

Figure 29:
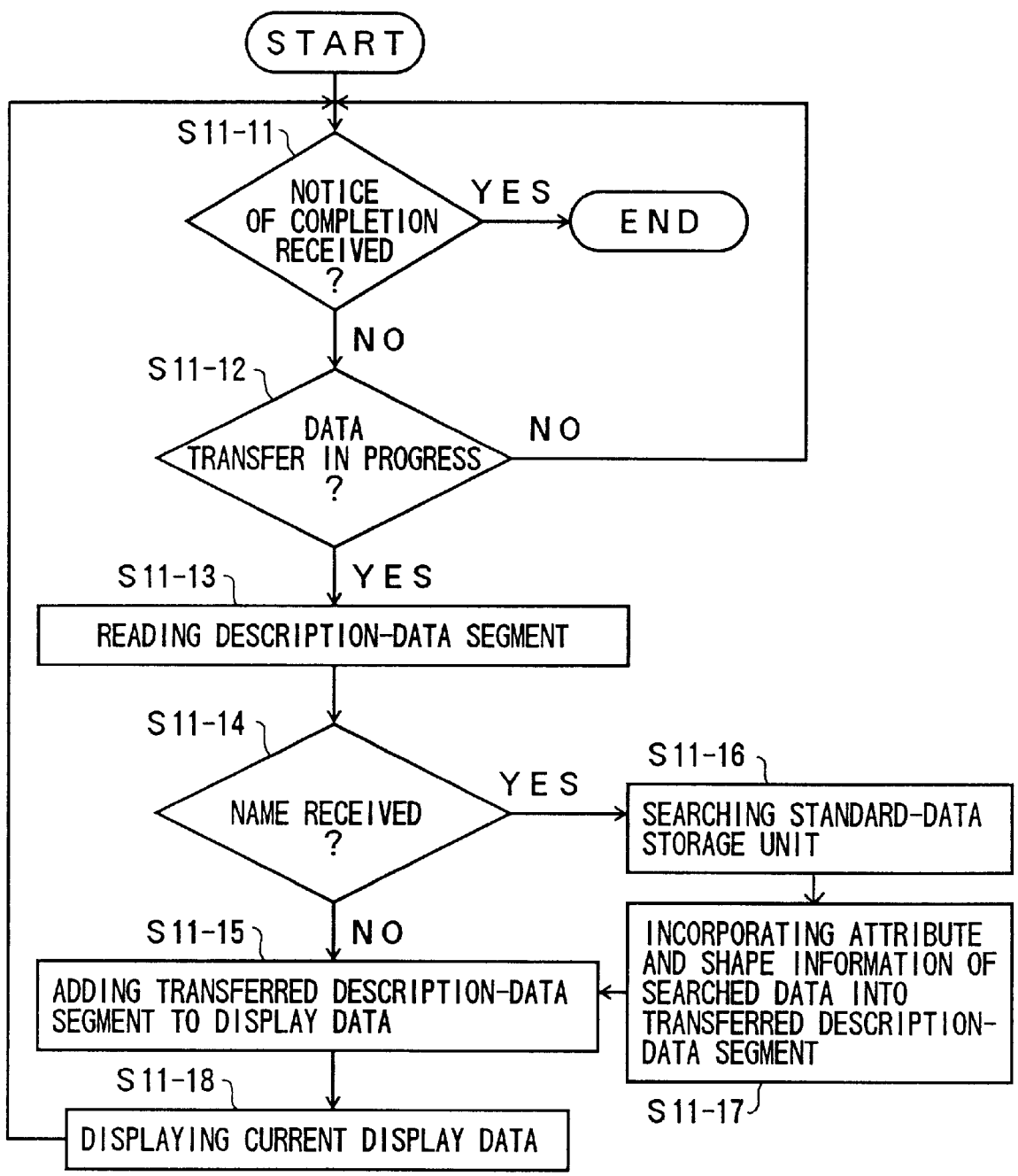
FIG. 29 is a flowchart of a process carried out by a data displaying and processing unit of a client in the eleventh embodiment.

FIG. 29 is a flowchart of a process carried out by the data displaying and processing unit 22 of the client 20A in the eleventh embodiment.

At a step S11-11, the data displaying and processing unit 22 checks whether a notice of completion has been received from the data receiving unit 21. If it has, the procedure ends. If the notice of completion has not been received, the procedure goes to a step S11-12.

At the step S11-12, the data displaying and processing unit 22 checks whether the data transfer is in progress. If it is, the procedure goes to a step S11-13. Otherwise, the procedure goes back to the step At a step S11-13, the data displaying and processing unit 22 reads a description-data segment sent from the data receiving unit 21.

At a step S11-14, the data displaying and processing unit 22 checks whether a name rather than attribute and shape information is contained in the transferred description-data segment. If it is, the procedure goes to a step S11-16. Otherwise, the procedure goes to a step S11-15.

At the step S11-16, the data displaying and processing unit 22 searches the standard-data storage unit 24 to find data having the transferred name.

At a step S11-17, the data displaying and processing unit 22 incorporates attribute and shape information of the searched data into the transferred description-data segment. After this step, the procedure goes to the step S11-15.

At the step S11-15, the data displaying and processing unit 22 adds the transferred description-data segment to the display data which is being displayed. Namely, the data displaying and processing unit 22 incorporates the transferred description-data segment into the display data which has already been or is being displayed on a screen.

At a step S11-18, the data displaying and processing unit 22 displays the current display data on the screen. After this step, the procedure goes back to the step S11-11.

By carrying out the process shown in the above-described flowchart, the virtual-world-description-data transfer system of the eleventh embodiment divides the virtual-world-description data into the description-data segments, and sends and displays the description-data segments one after another in an order of priority, while objects having lower priority than a predetermined priority level are transferred as object names, thereby allowing the receiver side to search the receiver-side database to find and display corresponding data having the transferred object names. In this manner, the amount of data transfer is reduced, so that objects having lower priority can be displayed earlier than otherwise. Also, an advantage is found in that desirable data can be set locally by registering data in the receiver-side database.

Further, the present invention is not limited to these embodiments, but various variations and modifications may be made without departing from the scope of the present invention.

What is claimed is:

1. A method of displaying a virtual world in a client device based on virtual-world-description data received from a server device via a communication line, said method comprising the steps of:
   a) receiving high-priority description-data segments one by one, the high-priority segments having a priority assigned thereto greater than a predetermined threshold,
   b) receiving names or two dimensional data of low-priority description-data segments one by one, the low-priority segments having a priority assigned thereto no greater than the predetermined threshold, the low-priority segments also being segments into which the virtual-world description data is divided; and
   c) displaying a virtual-world segment at every turn upon receipt of one of the high-priority segments, the names, and the two dimensional data, said virtual-world segment being a portion of said virtual world which corresponds to said one of the high-priority segments, the names, and the, two dimensional data.

2. The method as claimed in claim 1, further comprising a step of responding to and handling user operations made to said virtual world at all times including when said one of the high-priority segments, the names, and the two-dimensional data is being received and when said virtual-world segment is being displayed.

3. The method as claimed in claim 2, wherein said step a) comprises a step of receiving the high-priority description-data segments one by one in an order of the priority before said step b).

4. The method as claimed in claim 2, wherein said step a) comprises a step of receiving the high-priority description-data segments one by one in an order of the priority before said step b), and said method further comprises a step of sending information on said user operations to said server device to allow said server device to recalculate the priority under new conditions resulting from said user operations.

5. A method of sending virtual-world description data describing a virtual world from a server device to a client device via a communication line, said method comprising the steps of:
   a) dividing said virtual-world-description data into a plurality of description-data segments including high-priority description-data segments and low-priority description-data segments;
   b) sending the high-priority segments one by one to said client device, the high-priority segments having a Priority assigned thereto greater than a predetermined threshold; and
   c) sending names or two dimensional data of the low-priority segments one by one to said client device, the low-priority segments having a priority assigned thereto no greater than a predetermined threshold.

6. The method as claimed in claim 5, wherein said step b) comprises the steps of:
   1) assigning the priority to each of said description-data segments; and 2) sending the high-priority segments one by one in an order of the priority before said step c).

7. The method as claimed in claim 5, further comprising the steps of:

receiving information on user operations from said client device, said user operations being made to said virtual world at said client device; and recalculating the priority under new conditions resulting from said user operations.

8. The method as claimed in claim 5, wherein the two-dimensional data of the low-priority segments is sent as a single data segment which two-dimensionally represents a composite of corresponding virtual-world segments.

9. A device for displaying a virtual world based on virtual-world-description data received from a server device via a communication line, said device comprising:

a receiving unit which receives high-priority description-data segments one by one, the high-priority segments having a priority assigned thereto greater than a predetermined threshold, and receives names or two dimensional data of low-priority description-data segments one by one, the low-priority segments having a priority assigned thereto no greater than the predetermined threshold, the low-priority segments being segments into which said virtual-world description data is divided; and a display unit which displays a virtual-world segment at every turn when receiving one of the high-priority segments, the names, and the two dimensional data, said virtual-world segment being a portion of said virtual world which corresponds to said one of the high-priority segments, the names, and the two dimensional data.

10. The device as claimed in claim 9, further comprising a unit which responds to and handles user operations made to said virtual world at all times including when said one of the high-priority segments, the names, and the two-dimensional data is being received and when said virtual-world segment is being displayed.

11. The method as claimed in claim 10, wherein said receiving unit receives the high-priority segments one by one in an order of the priority before receiving one of the names and the two-dimensional data.

12. The device as claimed in claim 10, wherein said receiving unit receives the high-priority segments one by one in an order of the priority before receiving one of the names and the two-dimensional data, and said device further comprises a unit which sends information on said user operations to said server device to allow said server device to recalculate the priority under new conditions resulting from said user operations.

13. A device for sending virtual-world description data describing a virtual world to a client device via a communication line, said device comprising:

a processing unit which divides said virtual-world-description data into a plurality of description-data segments including high-priority description-data segments and low-priority description-data segments; and a transfer unit which sends the high-priority segments one by one to said client device, the high-priority segments having a priority assigned thereto greater than a predetermined threshold, and sends names or two dimensional data of the low-priority segments one by one to said client device, the low-priority segments having a priority assigned thereto no greater than a predetermined threshold.

14. The device as claimed in claim 13, wherein said transfer unit comprises:

a first unit which assigns the priority to each of said description-data segments; and a second unit which sends the high-priority segments one by one in an order of the priority before sending one of the names and the two-dimensional data.

15. The device as claimed in claim 14, further comprising a unit which receives information on user operations from said client device, said user operations being made to said virtual world at said client device, wherein said transfer unit further comprises a unit which recalculates the priority under new conditions resulting from said user operations.

16. The device as claimed in claim 13, wherein the two-dimensional data of the low-priority segments is sent as a single data segment which two-dimensionally represents a composite of corresponding virtual-world segments.

17. A machine-readable memory medium having a program embodied therein for controlling a server device and a client device so that said server device sends virtual-world-description data to said client device via a communication line and said client device displays a virtual world based on said virtual-world-description data, said program comprising:

first program-code means for causing said server device to generate description-data segments including high-priority description-data segments and low-priority description-data segments by dividing said virtual-world-description data;

second program-code means for causing said server device to send the high-priority segments one by one to said client device, the high-priority segments having a priority assigned thereto greater than a predetermined thresholds, and to send names or two-dimensional data of the low-priority segments one by one to said client device, the low-priority segments having a priority assigned thereto no greater than the predetermined threshold; and third program-code means for causing said client device to display a virtual-world segment at every turn when receiving one of the high priority segments, the names, and the two-dimensional data, said virtual-world segment being a portion of said virtual world which corresponds to said one of the high priority segments, the name, and the two-dimensional data.

18. The machine-readable memory as claimed in claim 17, further comprising fourth program-code means for responding to and handling user operations made to said virtual world at all times including when said client device is receiving one of the high-priority segments, the names, and the two-dimensional data and when said client device is displaying said virtual-world segment.

19. The machine-readable memory medium as claimed in claim 16, wherein said second program-code means comprises:

fifth program-code means for assigning the priority to each of said description-data segments; and sixth program-code means for sending the high-priority segments one by one in an order of the priority before sending one of the names and the two-dimensional data.

20. The machine-readable memory medium as claimed in claim 19, wherein said priority is determined based on a position of a viewpoint and a direction of view.

21. A system for displaying a virtual world by transferring virtual-world-description data, said system comprising:

a client device; and a server device coupled to said client device via a communication line, wherein said server device includes:

a processing unit which divides said virtual-world-description data into a plurality of description-data segments including the high-priority description-data segments and the low-priority description-data segments; and a transfer unit which sends the high-priority description-data segments one by one to said client device, which segments have priority assigned thereto greater than a predetermined threshold, and sends names or two dimensional data of the low-priority description-data segments one by one to said client device, which segments have priority assigned thereto no greater than the predetermined threshold; and said client device includes:

a receiving unit which receives the high-priority description-data segments one by one, and receives the names or the two dimensional data of the low-priority description-data segments one by one; and a display unit which displays a virtual-world segment at every turn when receiving one of the high-priority description-data segments, the names, and the two dimensional data, said virtual-world segment being a portion of said virtual world which corresponds to said one of the high-priority description-data segments, the names, and the two dimensional data.

22. The system as claimed in claim 19, wherein said client device further comprising a unit which responds to and handles user operations made to said virtual world at all times including when one of the high-priority segments, the names, and the two-dimensional data is being received and when said virtual-world segment is being displayed, and wherein said transfer unit comprises:

a unit which assigns the priority to each of said description-data segments; and a unit which sends the high-priority segments one by one in an order of the priority before sending one of the names and the two-dimensional data.

* * * * *

UNITED STATES PATENT AND TRADEMARK OFFICE
CERTIFICATE OF CORRECTION

PATENT NO.: 6,055,563
DATED : April 25, 2000
INVENTOR(S): Kaori ENDO et al.

It is certified that error appears in the above-identified patent and that said Letters Patent is hereby corrected as shown below:

Col. 26,      line 30, delete "," (second occurrence);
               lines 57-58, change "Priority" to --priority--;
               line 66, change "1)" to --b1)--.

Col. 27,      line 1, change "2)" to --b2)--.

Col. 30,      lines 5-6, delete the paragraph break.

Signed and Sealed this

Twenty-seventh Day of February, 2001

Attest:

NICHOLAS P. GODICI

Attesting Officer      Acting Director of the United States Patent and Trademark Office